United States Patent
Hu et al.

(10) Patent No.: US 12,000,943 B2
(45) Date of Patent: Jun. 4, 2024

(54) COMMUNICATION DEVICE FOR ESTIMATING AZIMUTH ANGLE, ESTIMATING METHOD FOR COMMUNICATION DEVICE, AND COMMUNICATION DEVICE FOR ESTIMATING POSITION BY CALCULATING EMISSION ANGLE

(71) Applicant: Pollux Technologies, Inc., Zhuhai (CN)

(72) Inventors: Cheng-Nan Hu, Zhuhai (CN); Phi-Li Lo, Zhuhai (CN); Cheng-Hsien Tsai, Zhuhai (CN); Chia-Bin Yang, Zhuhai (CN)

(73) Assignee: POLLUX TECHNOLOGIES, INC., Zhuhai (CN)

( * ) Notice: Subject to any disclaimer, the term of this patent is extended or adjusted under 35 U.S.C. 154(b) by 445 days.

(21) Appl. No.: 17/347,642

(22) Filed: Jun. 15, 2021

(65) Prior Publication Data

US 2022/0397634 A1    Dec. 15, 2022

(30) Foreign Application Priority Data

Jun. 9, 2021 (CN) .......................... 202110642581.9

(51) Int. Cl.
*G01S 5/02* (2010.01)
*H04W 4/02* (2018.01)
*H04W 4/029* (2018.01)

(52) U.S. Cl.
CPC .............. *G01S 5/02* (2013.01); *H04W 4/029* (2018.02)

(58) Field of Classification Search
CPC ................................ G01S 5/02; H04W 4/029

USPC .......................................................... 342/450
See application file for complete search history.

(56) References Cited

U.S. PATENT DOCUMENTS

| | | | | |
|---|---|---|---|---|
| 2014/0049428 | A1* | 2/2014 | Nguyen | G01S 3/06 342/448 |
| 2014/0218239 | A1* | 8/2014 | Sharawi | G05D 1/0094 342/422 |
| 2016/0047885 | A1* | 2/2016 | Wang | G01S 5/02 342/442 |
| 2019/0260120 | A1* | 8/2019 | Khushrushahi | H01Q 19/062 |
| 2023/0319805 | A1* | 10/2023 | Vankayala | G06N 3/084 370/329 |

FOREIGN PATENT DOCUMENTS

RU     2736414 C1 * 11/2020 .............. G01S 13/48

* cited by examiner

*Primary Examiner* — Harry K Liu
(74) *Attorney, Agent, or Firm* — McClure, Qualey & Rodack, LLP

(57) ABSTRACT

A communication device for estimating the azimuth angle includes a receiving module and an estimating module. The receiving module is configured to sequentially switch several azimuth angles to receive a first signal transmitted at the first transmitting angle from a first transmitting module of the first communication device. The estimation module is configured to calculate several signal powers of the first signal received by the receiving module at the several azimuth angles; to determine the maximum signal power among the several signal powers; to determine the pre-judged AOD according to the azimuth angle of the maximum signal; and to calculate the AOD of the associated first signal based on the pre-judged AOD and at least one azimuth angle adjacent to the pre-judged AOD among the several azimuth angles.

20 Claims, 27 Drawing Sheets

COMMUNICATION DEVICE FOR ESTIMATING AZIMUTH ANGLE, ESTIMATING METHOD FOR COMMUNICATION DEVICE, AND COMMUNICATION DEVICE FOR ESTIMATING POSITION BY CALCULATING EMISSION ANGLE

CROSS-REFERENCE TO RELATED APPLICATION

This application claims the priority benefit of CHINA Application serial no. 202110642581.9, filed Jun. 9, 2021, the full disclosure of which is incorporated herein by reference.

FIELD OF INVENTION

The invention relates to a communication technology field. More particularly, the invention relates to an estimating system, a method, a device, a positioning method and a storage medium for estimating the azimuth angle of the AOA (angle of arrival) and AOD (angle of departure, emission angle).

BACKGROUND

Nowadays, millimeter wave (mm-Wave) wireless communication is an important solution for the high-speed data transmission needs of the 5G mobile networks. The high rate of data transmission with millimeter waves has paved the way for the integration of several networks, such as multimedia, virtual reality (VR), augmented reality (AR), machine-to-machine (M2M), Internet of Things (IoT), and automobiles, Smart City, etc.

In order to provide satisfactory service quality, frequent channel estimation and beam shaping are required to compensate for the huge propagation loss and to access the network in real time with low latency requirements.

Beam shaping (BF) controls the optimal beam direction formed by setting the phase of the radiation signal of several antenna elements, and the transmission rate is maximized according to the optimal beam direction. The millimeter wave BF scheme based on estimating the entire channel state information (CSI) suffers from high computational load and large overhead. It is necessary to establish and maintain a robust RF link between the master device and the slave device in the wireless transmission system.

At present, in the communication system of the millimeter wave band, if the sender and receiver can determine the direction of each other's waves at the beginning of the communication according to their position information, the AOA provided by the base station, and the corresponding relational database between AOD and position, such as AOA (angle of arrival) or AOD (angle of departure), the communication link between the sender and receiver can be quickly established. However, the current estimating method for estimating the AOA of the millimeter wave signal and the corresponding relationship between AOD and position within the coverage of the base station is too complicated, and the estimating device is too complicated and heavy.

SUMMARY

In view of the above content, it is necessary to provide an estimating system, a method, a device, a positioning method and a storage medium for estimating the azimuth angle of the AOA/AOD, so as to simplify the measuring operation of the azimuth angle estimation, and to realize fast estimation of the AOA/AOD azimuth angle.

An aspect of this disclosure is to provide a communication device for estimating azimuth angle. The communication device includes a receiving circuit and an estimating circuit. The receiving circuit is configured to switch between several azimuth angles in order to receive a first signal transmitted with a first angle of departure (AOD) transmitted from a first transmitting circuit of a first communication device. The estimating circuit is configured to perform the following operations: calculate several signal power of the first signal with the receiving circuit located at the several azimuth angles; determine a maximum signal power of the several signal power; determine a pre-determined AOD according to a first azimuth angle corresponding to the maximum signal power; and calculate to obtain a final AOD corresponding to the first signal according to the pre-determined AOD and at least one azimuth angle of the several azimuth angles adjacent to the pre-determined AOD.

Another aspect of this disclosure is to provide an estimating method for a communication device includes the following operations: switching between several azimuth angles in order to receive a signal, in which the signal comprises a pre-determined AOD; calculating several signal power corresponding to the signal received according to the several azimuth angles; determining a maximum signal power of the several signal power; determining a pre-determined AOD according to a first azimuth angle corresponding to the maximum signal power; and calculating to obtain a final AOD according to the pre-determined AOD and at least one azimuth angle of the several azimuth angles adjacent to the pre-determined AOD.

Another aspect of this disclosure is to provide a communication device for estimating a position by calculating AOD. The communication device includes a receiving circuit and an estimating circuit. The receiving circuit is configured to switch between several azimuth angles in order to receive a first signal transmitted by a first transmitting circuit of a first communication device with a first AOD and a second signal transmitted by a second transmitting circuit of a second communication device with a second AOD. The estimating circuit is configured to perform the following operations: calculate several signal power of the first signal and the second signal received by the receiving circuit located at the several azimuth angles; determine a maximum signal power of the several signal power; determine a pre-determined AOD of the first signal and the second signal according to the azimuth angle corresponding to the maximum signal power; calculate to obtain a final AOD of the first signal and the second signal according to the pre-determined AOD and at least one azimuth angle of the several azimuth angles adjacent to the pre-determined AOD; and calculate a position of the communication device according to a known position of the first communication device and a final AOD of the first signal, and a known position of the second communication device and a final AOD of the second signal.

In the embodiments of the present disclosure, in the azimuth angle estimating system of the present embodiments, the signals are received by switching between several azimuth angles in order; and the maximum signal power of the signal power of the several signals received is determined, the pre-determined AOD is determined according to the azimuth angle corresponding to the maximum signal power, and the final AOD is calculated according to the pre-determined AOD and the signal levels of the two adjacent azimuth angles of the pre-determined AOD, in which the measuring operations of the AOD is simplified, fast estimation of the AOD is achieved, and the accuracy of measuring the AOD is increased.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following will clearly and completely describe the technical solutions in the embodiments of the present invention with reference to the accompanying drawings in the embodiments of the present invention. Obviously, the described embodiments are only a part of the embodiments of the present disclosure, rather than all implementations. Based on the embodiments of the present disclosure, all other embodiments obtained by those of ordinary skill in the art without creative work shall fall within the protection scope of the present invention.

It should be noted that when an element is referred to as being "electrically connected" to another element, it can be directly on the other element or a centered element may also exist. When an element is considered to be "electrically connected" to another element, it can be a contact connection, for example, it can be a wire connection, it can also be a non-contact connection, for example, it can be a non-contact coupling.

Unless otherwise defined, all technical and scientific terms used herein include the same meaning as commonly understood by those skilled in the technical field of the present invention. The terms used in the description of the present invention herein are only for the purpose of describing specific embodiments, and are not intended to limit the present invention. The term "and/or" as used herein includes any and all combinations of one or more related listed items.

In the following, some embodiments of the present invention will be described in detail with reference to the accompanying drawings. In the case of no conflict, the following embodiments and features in the embodiments can be combined with each other.

The present embodiment provides a method of measuring the AOD/AOA azimuth angle based on the timing lobe algorithm, and the estimating method for the AOD azimuth angle is used as an example. The timing lobe algorithm includes the following operations: alternatively switching the antenna beam of the several input several output (MIMO) system at different timings to estimate the algorithm of the target azimuth angle, which is also called timing switching algorithm (sequential switching) and lobe algorithm (lobe switching). The present embodiment uses the timing lobe algorithm to detect the information of the angles of the target object. The operation is simple, the calculation is simplified, and the target can be positioned with high precision degrees.

Figure 1:
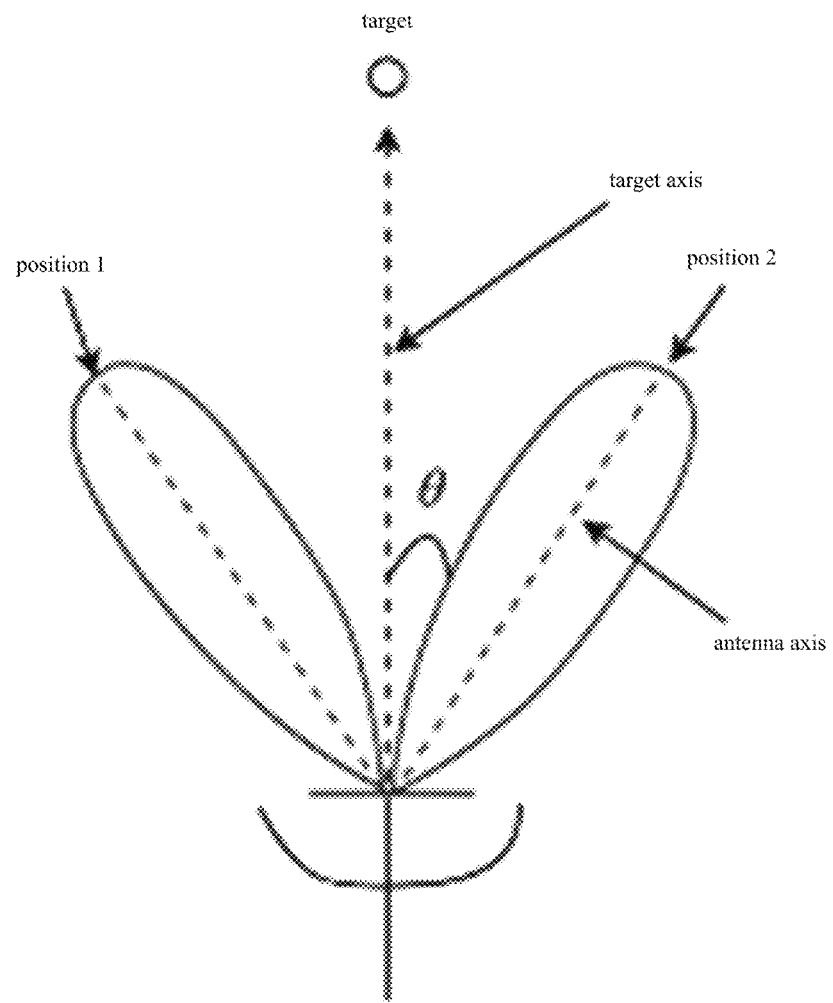
FIG. 1 is a schematic diagram illustrating the timing lobe algorithm in the polar coordinates according to an embodiment of the present disclosure.

For example, reference is made to FIG. 1. FIG. 1 is a schematic diagram of the timing lobe algorithm in polar coordinates. The antenna beam alternately switches between position 1 and position 2, and the target angle of the target antenna is measured by the timing lobe algorithm.

For ease of understanding, compare the timing lobe algorithm provided by the present disclosure with the single pulse algorithm (mono pulse algorithm). The difference between the two methods lies in the hardware design and the implementation rate. FIG. 2B is a functional block diagram of a channel detecting system with the single pulse algorithm. This method requires two power distribution networks (PDN) to achieve two outputs, in which one is the total channel and the other is the different channels. The additional cost and complexity of hardware design will be introduced. Since the two channels (SUM and DIFF) are running at the same time, the data rate of the single pulse algorithm is higher than that of the continuous wave method.

Figure 2A:
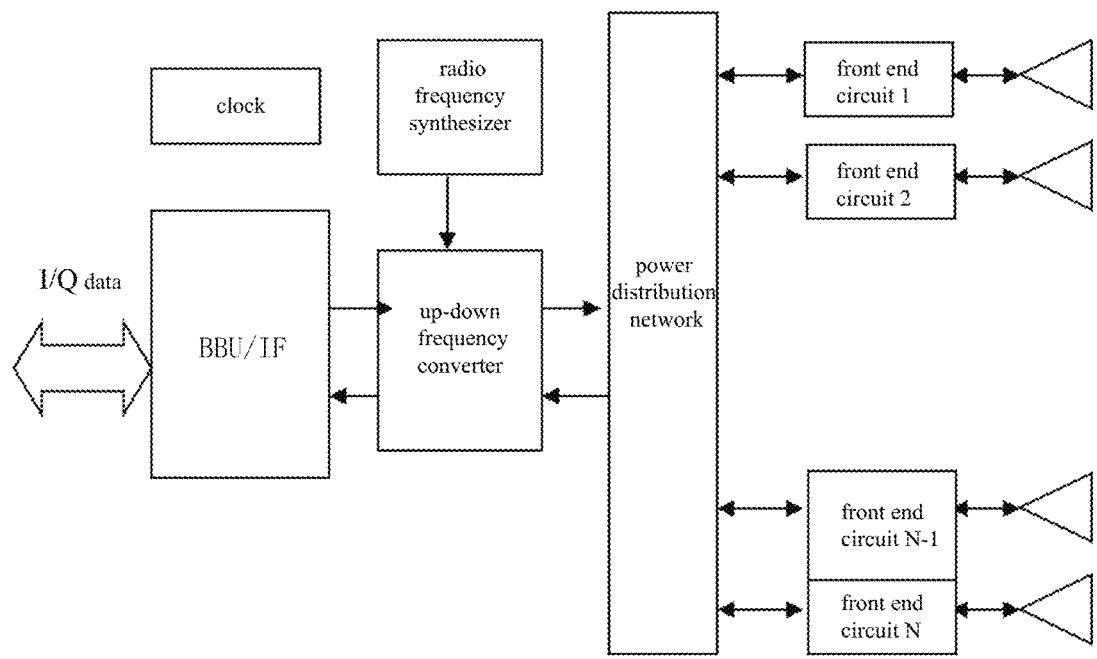
FIG. 2A is a function circuit diagram applying the timing lobe algorithm according to an embodiment of the present disclosure.
Figure 2B:
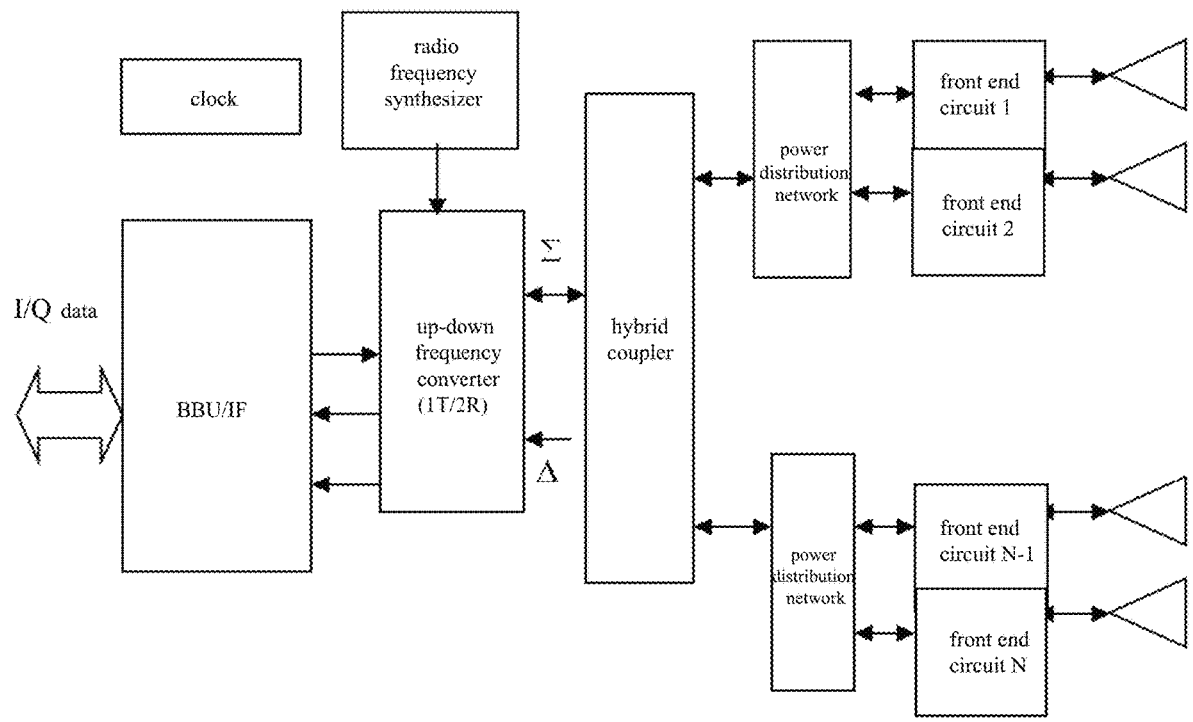
FIG. 2B is a function circuit diagram according to an embodiment of the present disclosure.

Reference is made to FIG. 2A. FIG. 2A is a function circuit diagram using the timing lobe algorithm. The device includes N millimeter wave antennas and N front end circuits (FEM). The power distribution network transmits the millimeter wave signal from the up-down frequency converter (UDC) to every front end radio frequency circuit (FEM). The UDC includes an up converter, which is configured to convert the frequency of the modulated intermediate frequency (IF) signal into a modulated millimeter wave radiation signal, and a down converter converts the received millimeter wave signal into an intermediate frequency (IF) signal for modulation. The radio frequency synthesizer (RF Synthesizer) generates a local oscillation signal to feed UDC as the main radio frequency signal of the up-down frequency converter.

Reference is made to FIG. 2B. The device includes N millimeter wave antennas, N front end circuits (FEM) series and two power distribution networks (PDN1 and PDN2), Two power distribution networks pass the millimeter wave signal from the up-down frequency converter (UDC) to each corresponding FEM. In the transmission mode, the 180° hybrid coupler (180° hybrid) acts as a power divider for the sum (SUM) signal and the difference (DIFF) signal. In transmit mode, the 180° hybrid coupler works in balanced mode (or called SUM channel mode) and distributes the millimeter wave signal from UDC to PDN1 and PDN2 with two signals of the same phase and the same equal power. In the receiving mode, the hybrid coupler works in the balanced mode to form a sum channel and works in the unbalanced mode at the same time; the received millimeter wave signals output by the two PDNs are combined in an equal power reverse phase (phase difference 180°) way. The DIFF channel can therefore use the single pulse algorithm to simultaneously estimate the degrees information of the azimuth angle.

Figure 3:
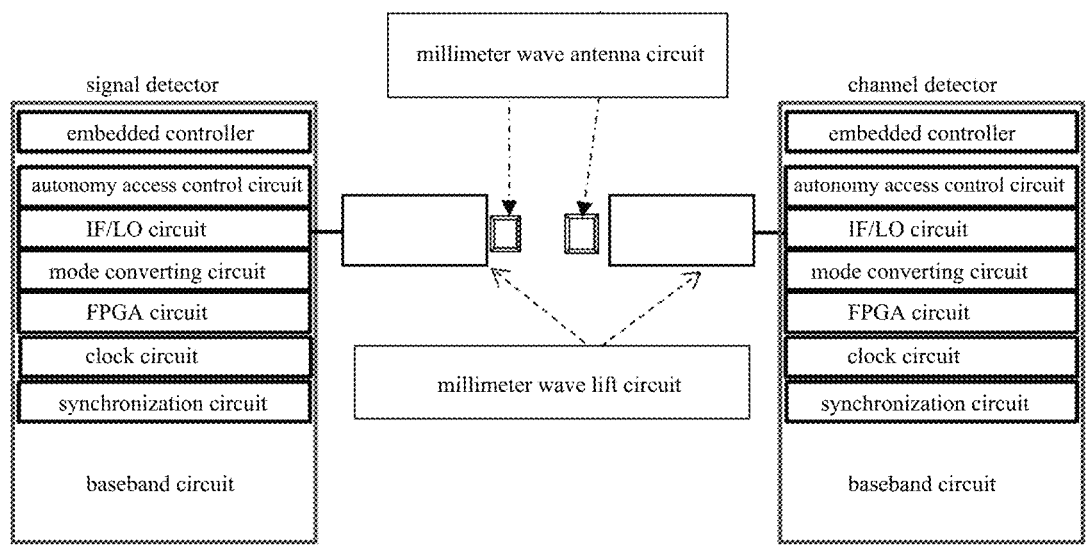
FIG. 3 is a schematic diagram illustrating the circuit of the channel detecting system according to an embodiment of the present disclosure.

Reference is made to FIG. 3. FIG. 3 is a schematic diagram of the circuit of the channel detecting system (Millimeter-wave Channel sounder system) according to an embodiment of the present disclosure, in which the baseband circuit can be NI-MTS, and NI-MTS can also be used as the main computer unit of the channel detecting system. The millimeter wave lift circuit (FIH mmW head; ADI ADMV 1018) is configured to up-frequency the baseband signal to the millimeter wave signal, or down-frequency the millimeter wave signal to the baseband signal; the millimeter wave antenna circuit (AiM) MIMO millimeter wave antenna circuit is an integrated circuit board (PCB) made of 32 (216) antennas and 8 front-end RF circuits (Front-End Module, FEM). The front-end RF circuit is an integrated circuit (Integrated Circuits, ICs), which consists of a 4-link channel transceiver circuit. Each transceiver integrated circuit includes an amplifier (or low noise power amplifier), a phase shifter and an attenuator, so that the channel detecting system can drive the front end circuit through the SPI instruction to realize the beam shaping function.

Figure 4A:
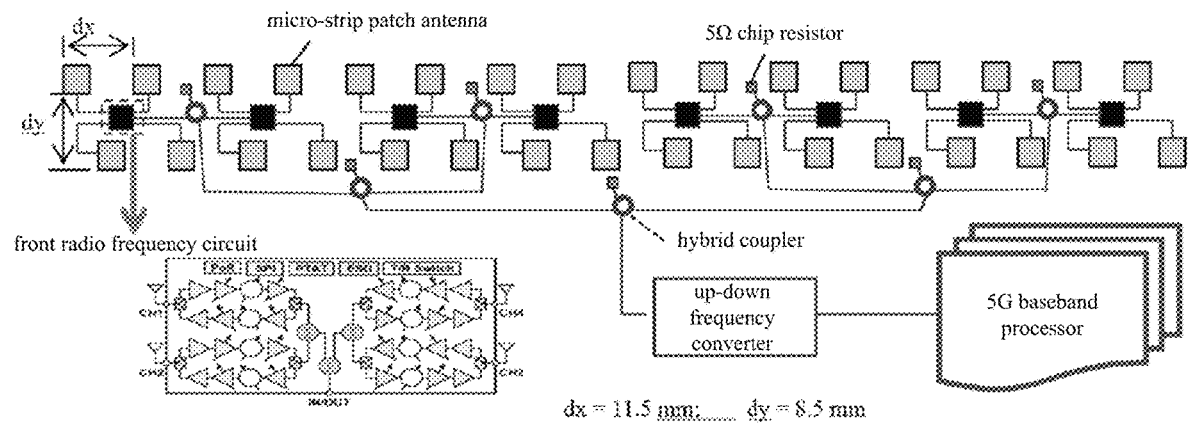
FIG. 4A is a schematic diagram illustrating a millimeter wave antenna circuit according to an embodiment of the present disclosure.
Figure 4B:
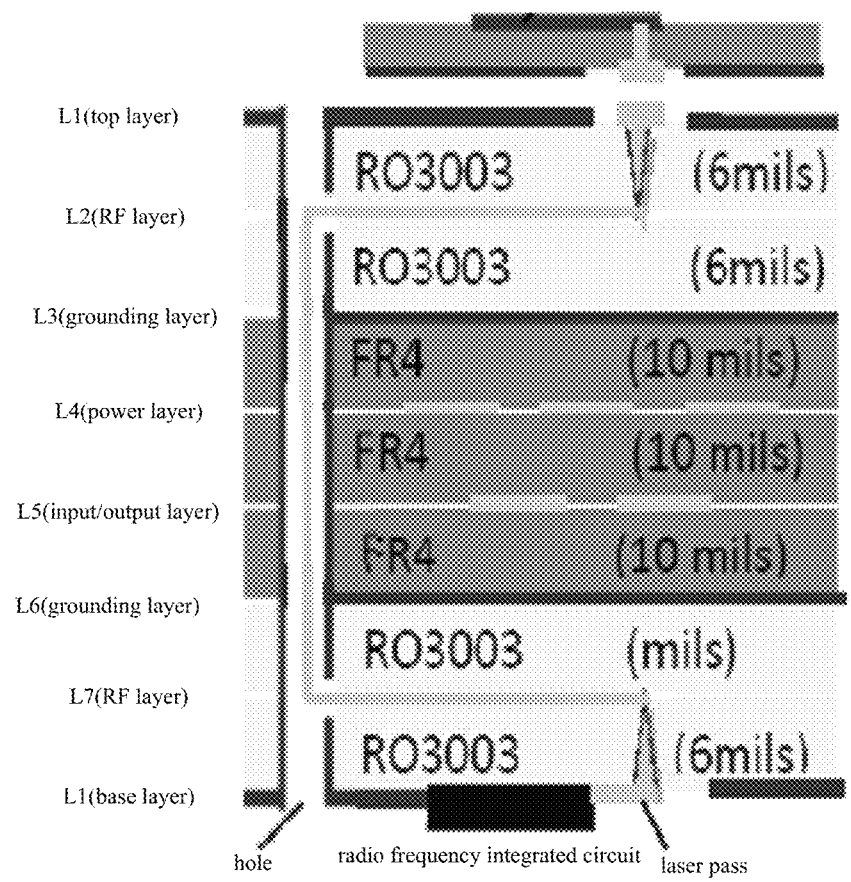
FIG. 4B is a schematic diagram illustrating a PCB stack according to an embodiment of the present disclosure.
Figure 4C:
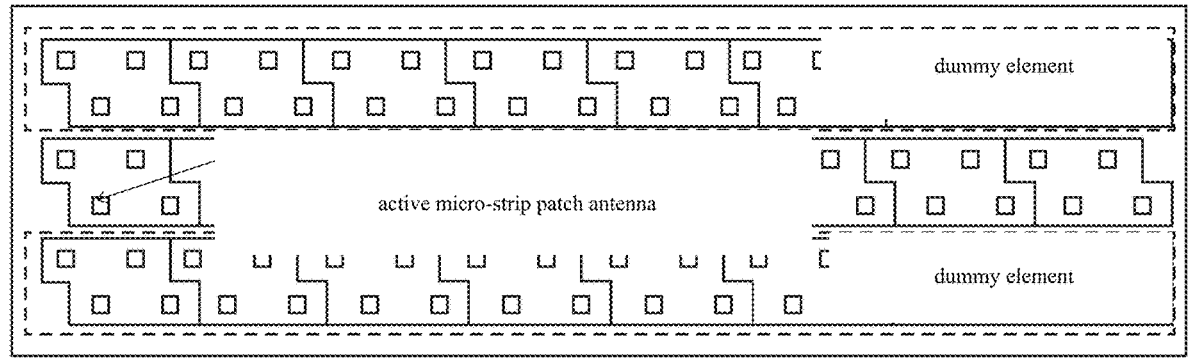
FIG. 4C is a schematic diagram illustrating a finish product photo diagram according to an embodiment of the present disclosure.
Figure 4C:
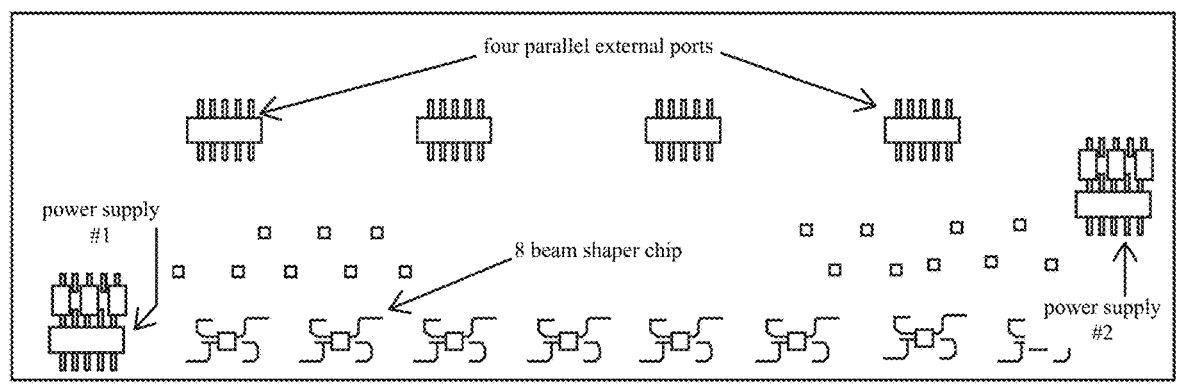

Reference is made to FIG. 4A, FIG. 4B and FIG. 4C at the same time. FIG. 4A is a design diagram of a millimeter wave antenna circuit, FIG. 4B is a PCB stack diagram, and FIG. 4C is a finish product photo diagram.

As illustrated in FIG. 4A, the millimeter wave antenna circuit includes several micro-strip patch antenna circuits, the chip resistor, the beam former and the hybrid coupler. The antenna circuit is composed of 4 micro-strip patch antennas and a millimeter wave radio frequency front end circuit (FEM).

In FIG. 4B, the patch antenna is installed on an 8-layer circuit board. The 8-layer circuit boards includes the following layers: the first layer is the top layer, the second layer is the RF layer, the third layer is the grounding layer, the fourth layer is the power layer, the fifth layer is the input/output layer, the sixth layer is the grounding layer, the seventh layer is the RF layer, and the eighth layer is the base layer. FIG. 4B also shows the thickness of each layer.

The circuit board in FIG. 4C includes four parallel external port ports, 8 millimeter wave radio frequency front end circuit (FEM) chips, a heat dissipation element and a power supply interface.

Figure 5A:
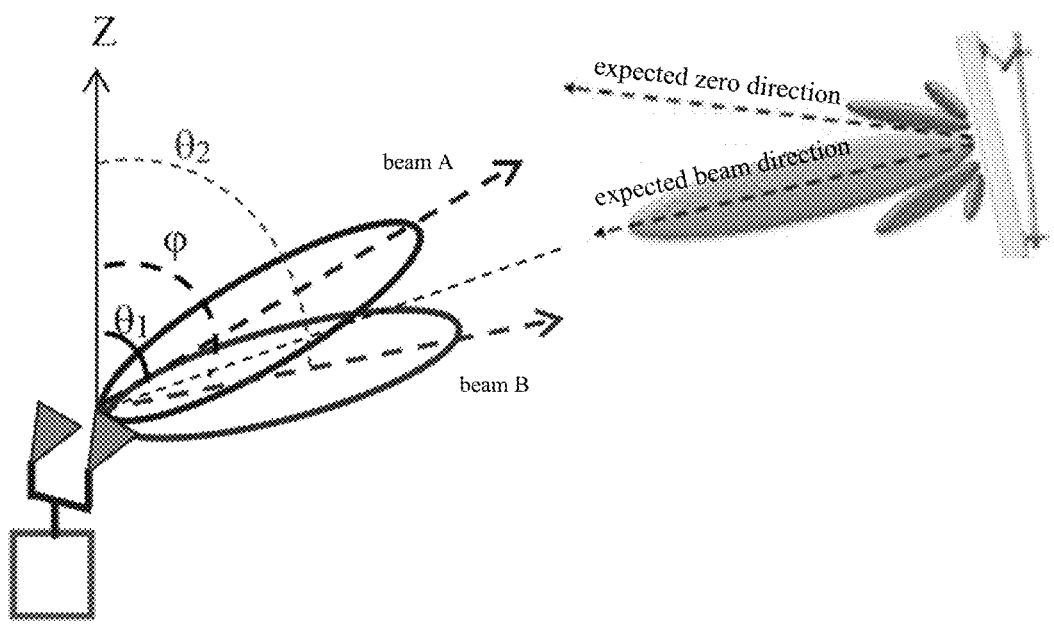
FIG. 5A is a implementation architecture diagram of a timing lobe algorithm according to an embodiment of the present disclosure.
Figure 5B:
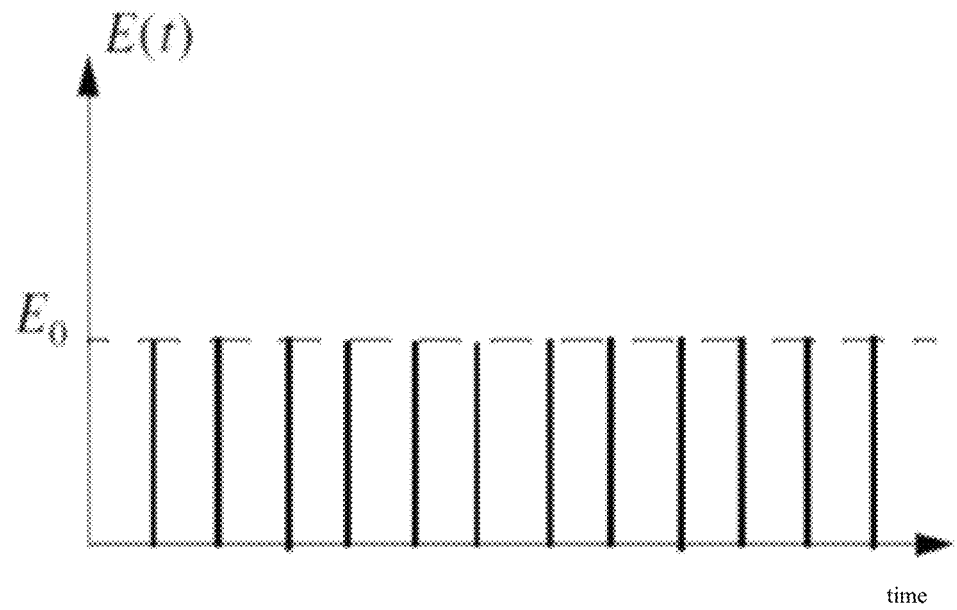
FIG. 5B is a schematic diagram of the signal level with the same amplitude generated with the target located at the antenna sight axis according to an embodiment of the present disclosure.

Reference is made to FIG. 5A and FIG. 5B. FIG. 5A is an implementation architecture diagram of the timing lobe algorithm, and FIG. 5B is a schematic diagram of the signal level with the same amplitude $E_0$ generated by the target located on the antenna sight (LOS) axis. Between the two predetermined symmetrical positions of the antenna sight axis (Line Of Sight, LOS), the pen-shaped beam of the antenna is switched in order to measure the target angle. In other words, by switching between the two azimuth angles in order via the antenna beam, the channel detecting system can estimate the error signal value $\varphi$ due to the azimuth angle difference, and add the estimated angle error value $\varphi$. Among them, as shown in FIG. 5B, the signal level is zero error. For example, when the target is located on the antenna sight, as shown in FIGS. 5A and 5B, the antenna pen-shaped beam (pencil beam) A and B will receive two electromagnetic reflected wave of the signal level (zero error signal) of the same amplitude $E_0$. Therefore, the angle error value of the target is the average value between the antenna pen-shaped beams A and B; $\varphi=(\theta_1+\theta_2)/2$.

When the target object deviates from the antenna sight axis (as shown in FIGS. 5A and 5B, when the target object is located at the position B), as the antenna pen-shaped beam switches to the B direction, the signal level amplitude returned from the target increases to the maximum value. And when the pen-shaped beam direction is switched to A beam, the signal level returned from the target will be the minimum value decremented from the amplitude maximum value.

Therefore, the amplitude of the target echo signal level is different, and the amplitude changes from the maximum value of beam B position to the minimum value of beam A position. In other words, amplitude modulation (AM) exists in the envelope of the echo signal. The AM envelope modulation signal corresponds to the relative position change of the target between beam B and beam A. That is, the angle error value (φ) can be estimated through the extracted AM envelope, and the sign of the voltage difference determines the direction of the angle error (φ).

Figure 6A:
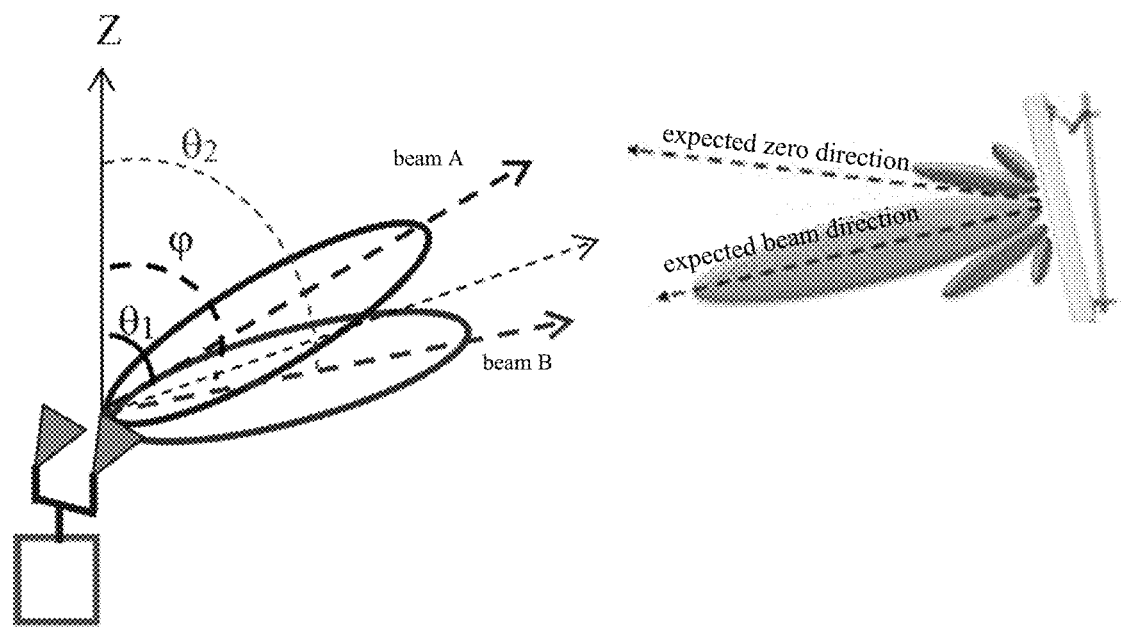
FIG. 6A is an implementation architecture diagram of the timing lobe algorithm according to another embodiment of the present disclosure.
Figure 6B:
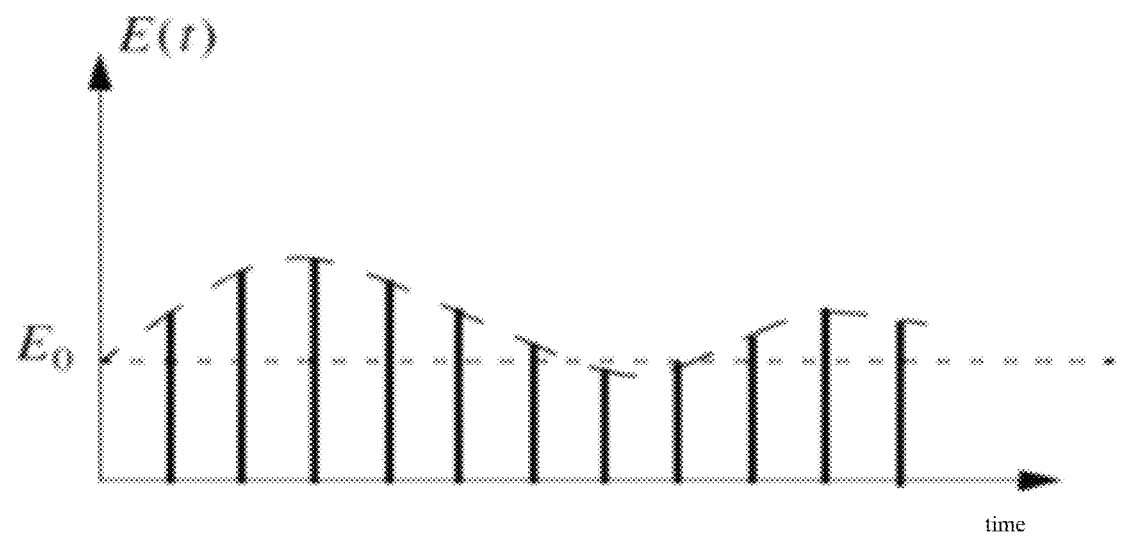
FIG. 6B is a schematic diagram illustrating the signal level with different amplitude with the target deviating from the antenna sight axis according to an embodiment of the present disclosure.

In an embodiment, as illustrated in FIG. 6A, the millimeter wave antenna circuit has an evenly distributed array antenna, and the beam of the array antenna is switched between azimuth angle $\pm\theta_0$ in order. FIG. 6B is the signal levels generated with the target deviating from the antenna sight axis line, and the signal levels do not include the same amplitude, that is, the signal levels of the difference signal exist. If the azimuth angle error of the target deviating from the antenna sight axis (Boresight) is $\phi(-\theta_0<\phi<\theta_0)$, the returned signal levels are detected corresponds to two antenna beam pointing to the by $(-\theta_0<\phi<\theta_0)$. The two sets of signal levels are expressed as:

$$S_A(\varphi) \cong \cos\left(\pi\frac{d}{\lambda}\sin(\theta_0 - \varphi)\right) \quad (1.a)$$

$$S_B(\varphi) \cong \cos\left(\pi\frac{d}{\lambda}\sin(\theta_0 - \varphi)\right) \quad (1.b)$$

Among them, φ is the azimuth angle error of the target azimuth deviating from the view axis (Boresight), d is the element spacing between two adjacent antennas, and $-\theta_0$ and $+\theta_0$ are the pointing angle of the two antennas respectively.

The sum signal and difference signal of the returned signal levels ($S_A$ and $S_B$) of the two antenna beam pointing are:

$$\sum(\psi) = S_A + S_B \approx \cos\left(\pi\frac{d}{\lambda}\cdot\sin(\varphi)\right); \quad (2.a)$$

$$\Delta(\psi) = S_A - S_B \approx \sin\left(\pi\frac{d}{\lambda}\cdot\sin(\varphi)\right). \quad (2.b)$$

When the target azimuth deviating from the azimuth angle error (φ) generated by the axis line is between azimuth angle, it is a small angle deviation value, and the following formula azimuth angle estimation error can be applied:

$$\varphi \cong k_f \cdot \tan^{-1}\left(\frac{\Delta(\varphi)}{\sum(\psi)}\right) \quad (3)$$

d is the element spacing between two adjacent antenna elements, and $k_f$ is the slope parameter obtained by calibration.

Figure 7:
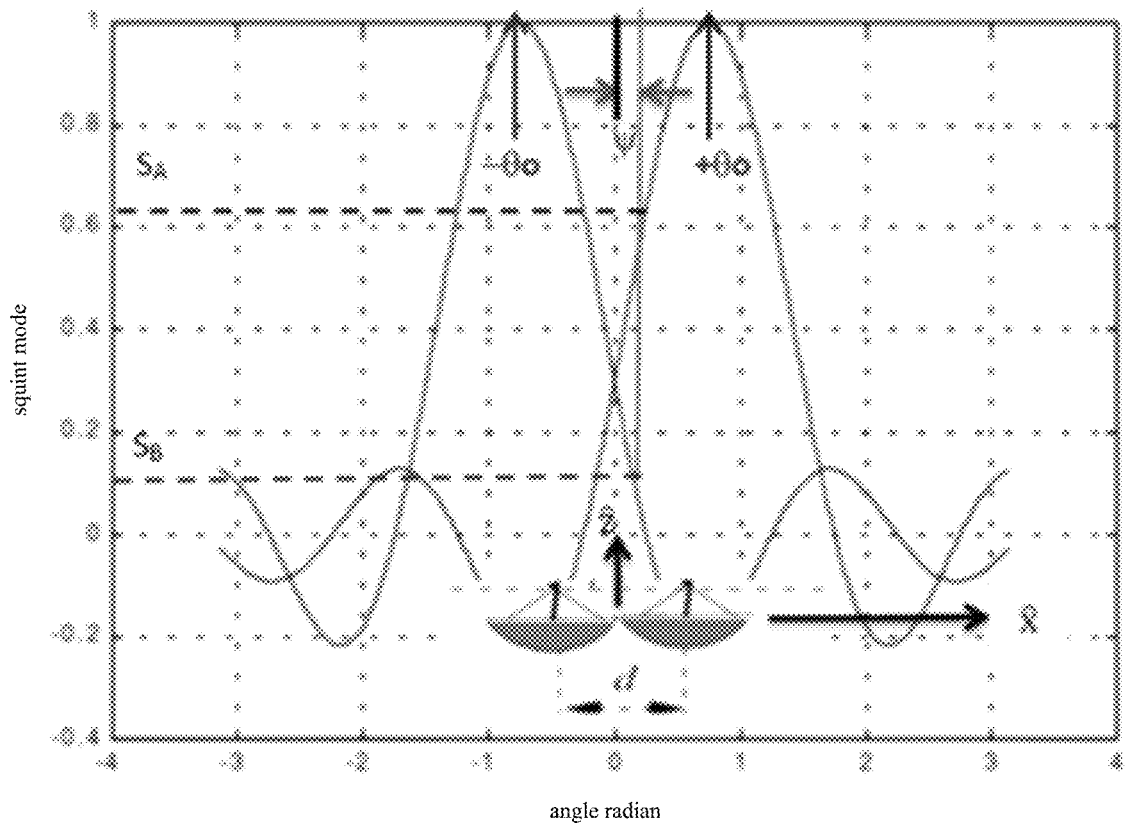
FIG. 7 is a schematic diagram illustrating the azimuth deviating angle error of the array switching the pointing angle of the antenna beam to the two directions according to an embodiment of the present disclosure.

FIG. 7 shows the schematic diagram of switching the pointing angle of the array antenna beam to two adjacent azimuth angles and the target azimuth deviating from the angle error. The azimuth angles $-\theta_0$ and $+\theta_0$ of the two wire antenna beams are sum respectively, and the target azimuth deviating from the angle error is φ, $S_A$ and $S_B$ are the signal levels of the corresponding signals of the two antenna beams, and d is the element spacing between two adjacent antennas.

Figure 8:
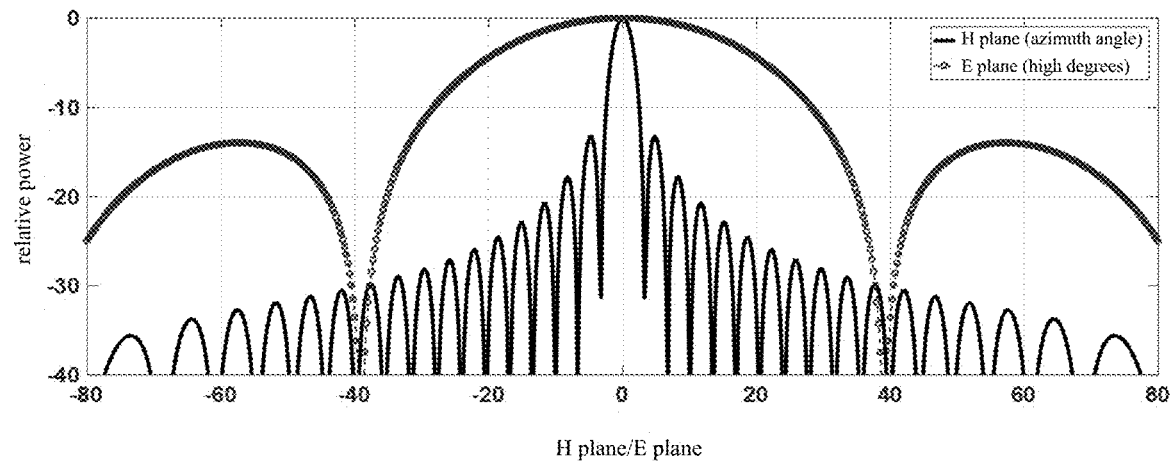
FIG. 8 is a simulation diagram illustrating an antenna radiation pattern architected by the millimeter wave antenna circuit according to an embodiment of the present disclosure.
Figure 9:
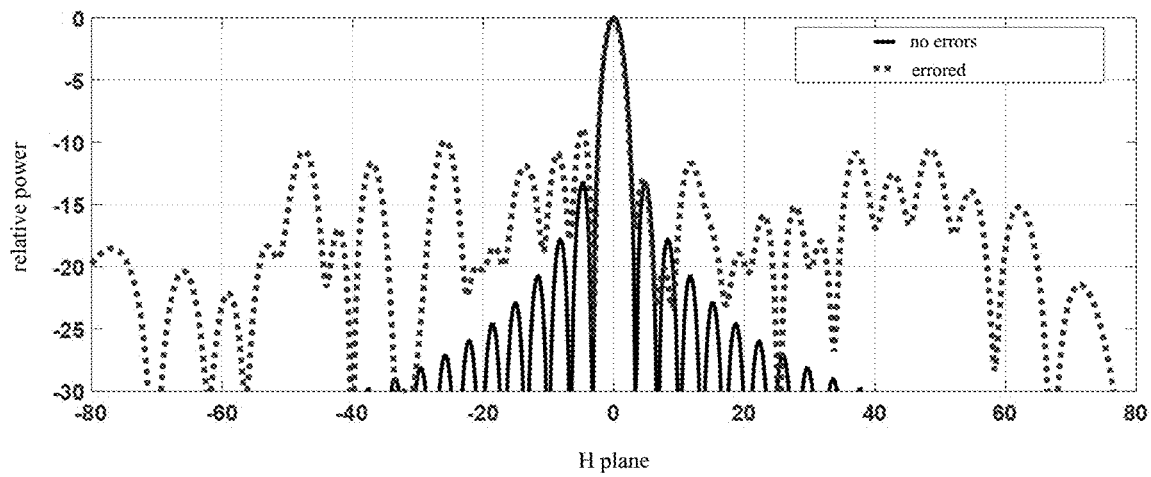
FIG. 9 is a simulated comparison chart illustrating the antenna radiation pattern architected by the millimeter wave antenna circuit according to an embodiment of the present disclosure.

FIG. 8 and FIG. 9 respectively apply 32 sets of antennas to perform numerical analogy analysis on the millimeter wave antenna circuit shown in FIG. 6. FIG. 7 is the antenna radiation pattern simulation diagram of the millimeter wave antenna circuit, showing horizontal/vertical half-power beam width of the antenna circuit (Half-Power Beam width, HPBW, half-power beam width. That is, 3 dB beam width) is 3°/36°. The phase error of the array antenna is uniformly distributed and the peak variable is between ±60°. FIG. 9 is the antenna radiation pattern simulated comparison chart of the millimeter wave antenna circuit. From FIG. 9, it can be seen that the phase error makes the side lobe peak of the array antenna field increases, the beam pointing slightly offsets and the gain decreases.

Figure 10:
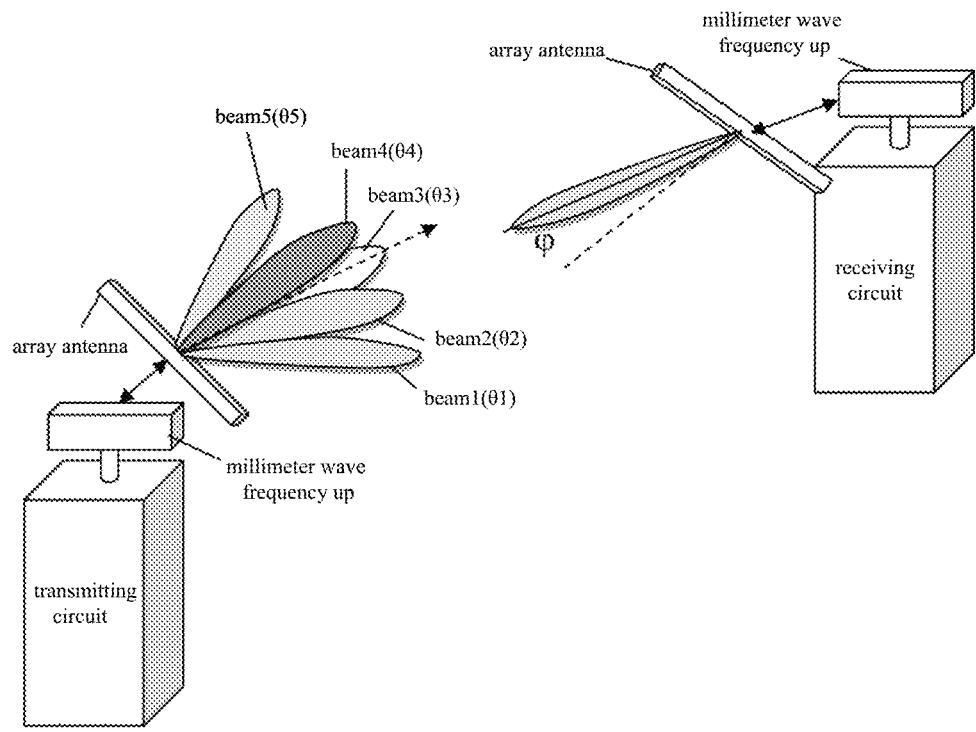
FIG. 10 is a schematic diagram illustrating a channel detecting system hardware architecture design according to an embodiment of the present disclosure.

Reference is made to FIG. 10. FIG. 10 is a schematic diagram for the channel detecting system hardware architecture design. The channel detecting system includes transmitting circuit and receiving circuit. Both transmitting circuit and receiving circuit include baseband circuit, millimeter wave lift circuit and millimeter wave antenna circuit.

The millimeter wave antenna circuit includes 2×16 groups of the millimeter wave antenna.

The transmitting circuit and the receiving circuit establish a communication connection through the millimeter wave signal. The transmitting circuit and the receiving circuit can be located on communication devices with different structures, or on communication devices with the same structure. For example, the transmitting circuit can be located on a communication device such as a millimeter wave base station, and the receiving circuit can be located on a communication device such as a mobile phone. The transmitting circuit can be located on a communication device such as a mobile phone. The receiving circuit can be located on a millimeter wave base station communication device. In another embodiment, the transmitting circuit and the receiving circuit are both located on a communication device such as a millimeter wave base station and/or a mobile phone.

Specifically, the transmitting circuit points the antenna beam to the AOD azimuth angle at a specific timing and transmits the signal, and according to the specific timing, within the beam scanning range, with half power beam width as the interval, the receiving circuit switches different beam points in order and receives the corresponding signal.

In an embodiment, the carrier signal sent by the transmitting circuit has a frequency of 28 GHz, and the base frequency signal is a ZCPN pulse (Sequence) with a bandwidth of 800 MHz. According to the half-power beam width ($\theta_{BW}=3°$), 31 different beam points are in need to cover the beam scanning range.

In an embodiment, the array antenna beam of the channel detecting system receiving circuit scans four scanning areas, and each area includes at least one array antenna. The system that controls the array antenna will scan according to the set azimuth angle and receive the millimeter wave signal sent by the transmitting circuit. In this embodiment, the array antenna of the area is a 16 antenna structure.

The array antenna beam of the channel detecting system receiving circuit scans four scanning areas, and each area has at least one array antenna. The system that controls the array antenna scans according to the set azimuth angle and receives the millimeter wave signal sent by the transmitting circuit.

In the embodiments of the present disclosure, when the array antenna in the three scanning areas of the receiving circuit scans within the pre-determined loop scanning time and receives the millimeter wave signal sent by the transmitting circuit with different incident angles, the array antenna in the scanning area receives the millimeter wave signal sent by the transmitting circuit with different beam incident angles. The three magnetic areas mentioned are respectively 0 to 120 degrees, 120 to 240 degrees, and 240 to 360 degrees.

Taking FIG. 10 as an example, the receiving circuit switches between different beam directions in order and receives the signals of beam 1, beam 2, beam 3, beam 4 and beam 5, in 5 directions, and the receiving circuit calculates the signal power (carrier-to-interference ratio, CIR). The signal power in order of each position is P1, P2, P3, P4, and P5.

Figure 11:
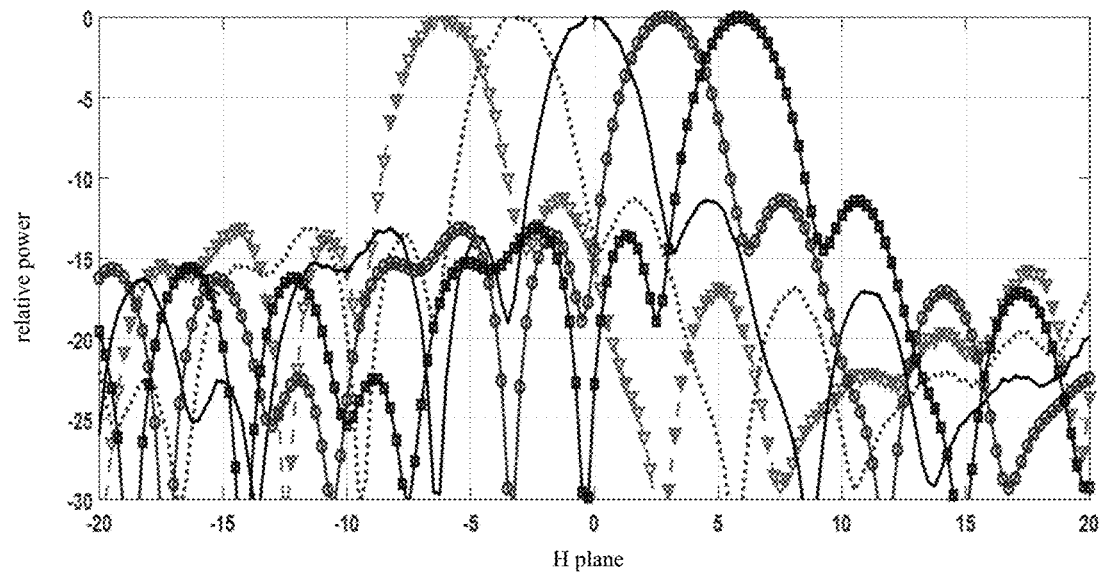
FIG. 11 is a simulation diagram of an antenna radiation pattern scanning directed by the beam according to an embodiment of the present disclosure.

FIG. 11 is the antenna radiation pattern simulation diagram of 5 beam scanning points, in which the pointing angles of the 5 beams are −6°, −3°, 0, +3° and +6° in turn.

Reference is made to FIG. 10 again. The beam 3 azimuth pointing of the receiving circuit is the closest to the signal transmitted by the receiving circuit. Therefore, the calculation and judgment of the receiving circuit shows that the signal power P3 of the beam 3 pointing is the maximum value of the five received signals, that is, the AOD azimuth angle is located between beam 3 orientation and the adjacent beam pointing ($\theta_3 \pm \theta_{BW}$). Then the timing lobe algorithm is applied, and the receiving circuit receives two different beam pointing (0°−1.5° and 0°+1.5°) signals (for example, beam 2 and beam 4) in order.

Figure 12:
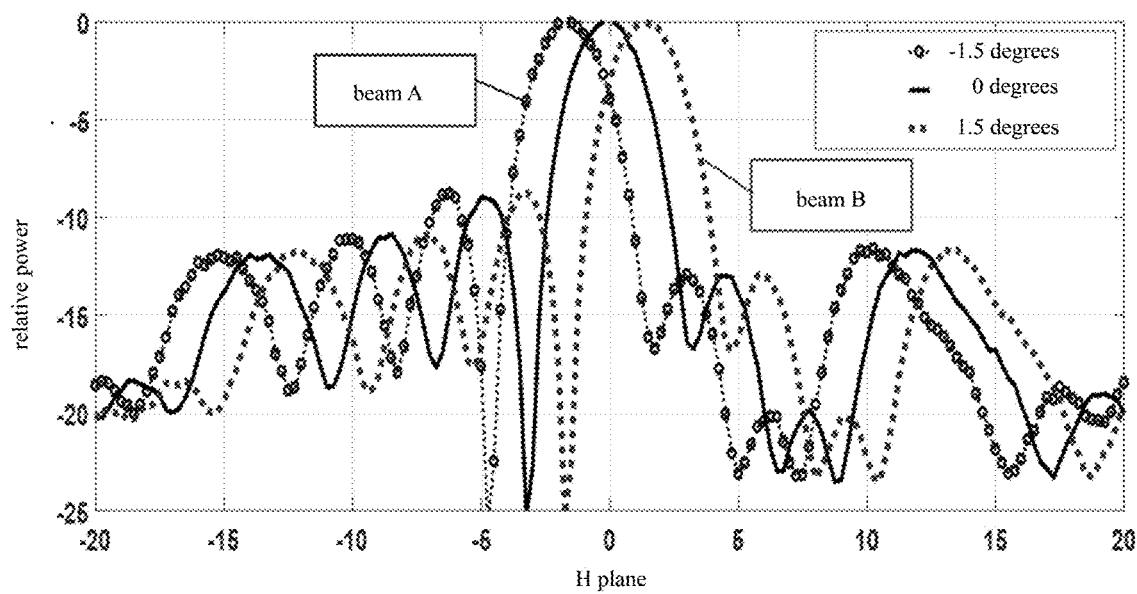
FIG. 12 is a simulation diagram of an antenna radiation pattern scanning directed by the two beams in order according to an embodiment of the present disclosure.

As shown in FIG. 12. Let $S_A = \sqrt{P_4}$ and $S_B = \sqrt{P_2}$, calculate the estimate value of AOD azimuth angle by timing lobe algorithm (for example: reference is made to formula 3).

Figure 13:
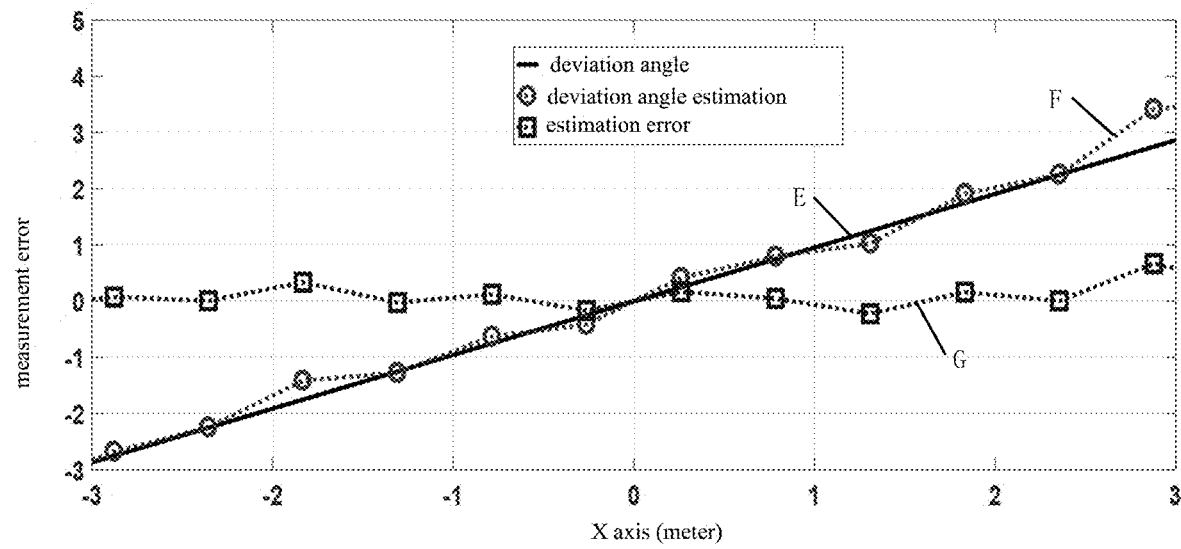
FIG. 13 is a numerical analysis simulation result of a lateral displacement variation calculated with applying the timing lobe algorithm azimuth angle estimation error according to an embodiment of the present disclosure.

In an embodiment, set the vertical distance (Down-range; Z axis line) to 60 meters and the horizontal displacement (cross-range; X axis line) to vary between 3 meters. FIG. 13 is an illustration of the simulation result. The solid line E represents the AOD azimuth angle ((e) corresponding to the lateral displacement (cross-range; X axis line). The dashed F circle symbol represents the AOD azimuth angle of the simulation result when the transmitting circuit is laterally displaced, and an error value between the original azimuth angle and the AOD azimuth angle of the simulation result is compared and displayed, and the dashed G square symbol represents the estimate angle error value. The numerical analysis simulation result shows that the precision of azimuth angle estimation by applying the timing lobe algorithm is within 0.5 degrees.

However, there exist several reflection effects of scattering objects and measurement errors caused by noise in the actual measurement environment. Therefore, numerical analysis methods must be configured to verify the reliability of the timing switching algorithm. In an embodiment, it is assumed that the measurement error value generated by all environmental factors is a Gaussian distribution with zero mean, and three different standard error values are set: 2.5 dB, 1.5 dB and 0.5 dB. After applying simulation modeling (for example, Matlab code) and performing 100,000 Monte-Carlo simulation analysis (Monte-Carlo Simulation). The analysis result is shown in FIG. 14.

Figure 14:
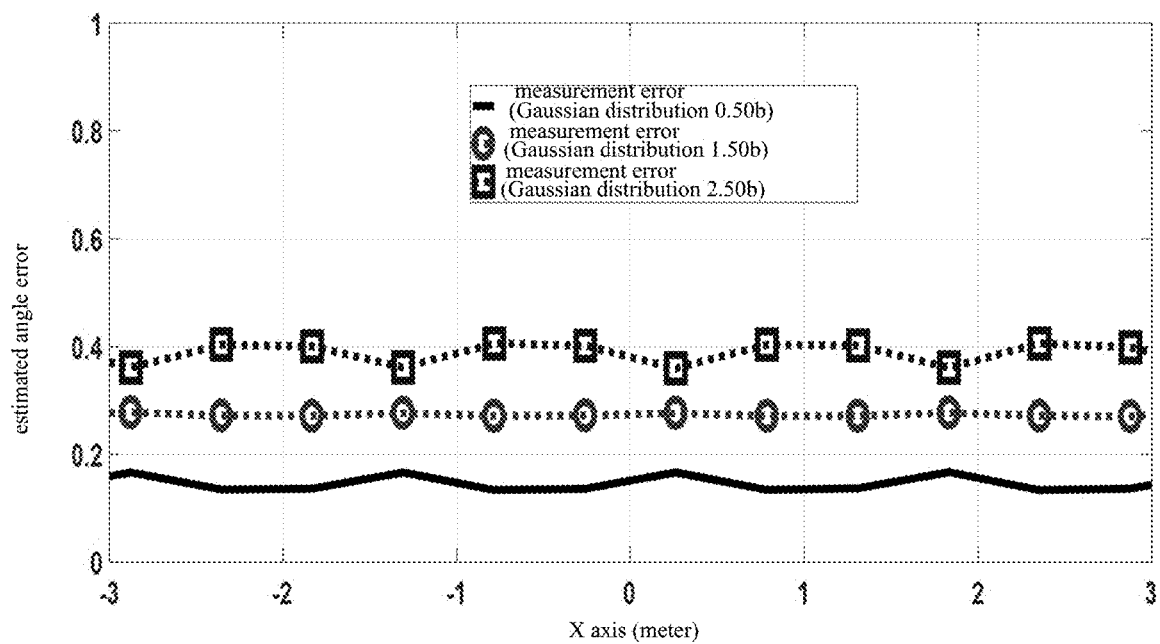
FIG. 14 is a result diagram by performing 100,000 times of simulation analysis of the Monte Carlo value according to an embodiment of the present disclosure.

From the numerical simulation analysis results in FIG. 14, it can be seen that the standard deviation error of the azimuth angle estimation degrees is less than 0.5 degrees, that is, when the target is located at a distance of 60 meters, the estimated AOA/AOD of this method is applied, and the azimuth error value is less than 0.53 meter. The angle measure precision degree is better than satellite positioning system (positioning precision degree is less than 1 meter) and Bluetooth indoor positioning system (positioning precision degree between 5 meter −20 meter). The positioning method provided by the present disclosure is compared with the positioning method of navigation satellites at outdoor, the positioning azimuth angle is relatively improved by more than 20% compared with Bluetooth positioning indoors.

Figure 15:
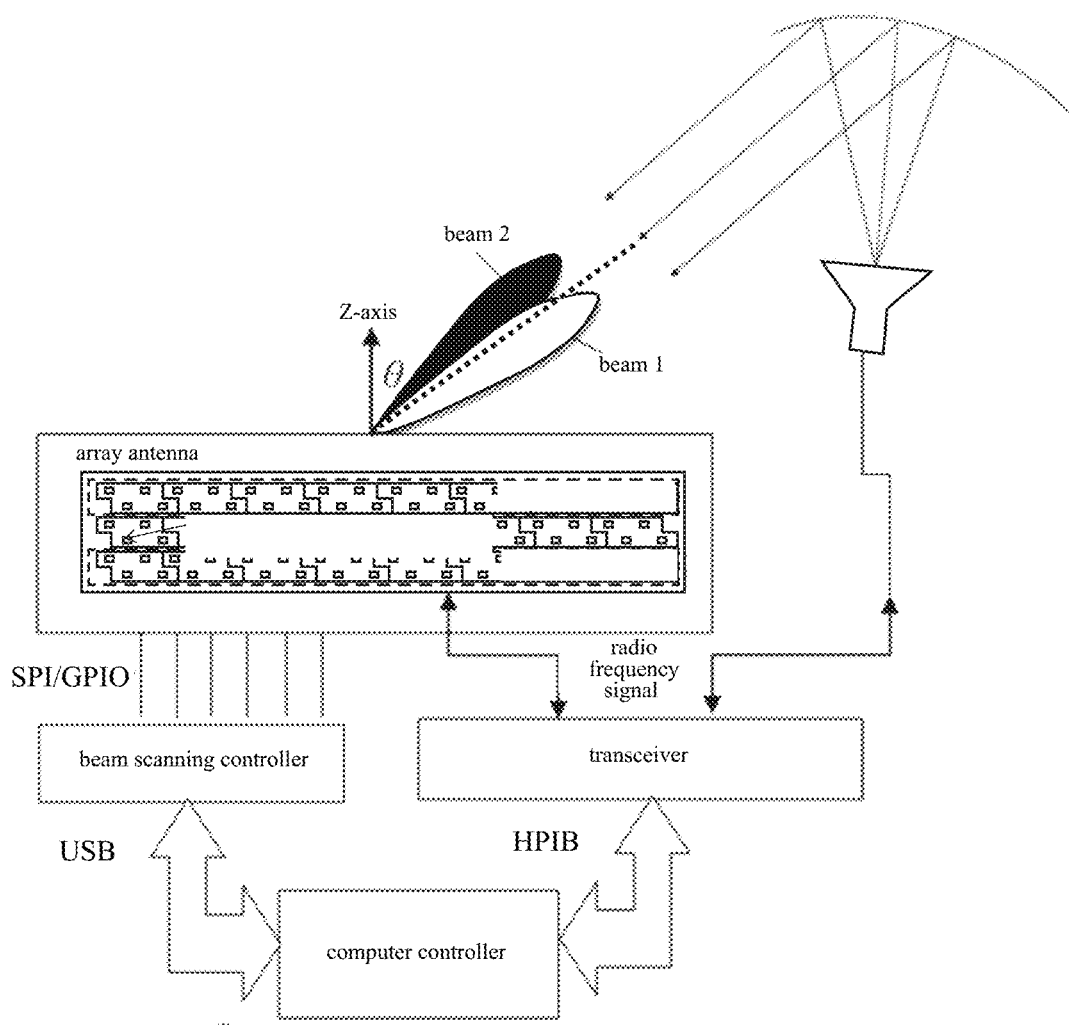
FIG. 15 is a schematic diagram of a testing device according to an embodiment of the present disclosure.

In an embodiment, FIG. 15 shows a schematic diagram for the experimental device. FIG. 15 can be used in test darkroom with the air interface reduced distance field. The test darkroom with air interface reduced distance field provides a stable field measurement environment to verify the timing lobe algorithm for measuring the fine degrees of the azimuth angle. In FIG. 15, the far-field plane wave is configured to simulate the distant target object. At the same time, the reduced-field plane wave effect can ensure the stability of the transmitted signal and is not affected by the serious spatial attenuation loss of the millimeter wave.

Specifically, the millimeter wave antenna circuit (equivalent to the receiving circuit in FIG. 6) is placed on the rotating platform of the OTA test darkroom, and the AOD azimuth angle ($\varphi$) can be controlled by the rotating platform. The reflective surface of the antenna of the reduction field receives the transmitted signal from the antenna circuit. With two same axis cables (K-band cables), the millimeter wave group antenna system and the retracted field reflector antenna to the 4-port VNA (vector network analyzer) are connected respectively. VNA is configured to replace NI/MTS and FIH mm-Wave Head, and the transceiver function of the channel detecting system is performed. The control system of the test system is executed by an external NB (or computer). The program command code is sent through the USB interface to the beam pointing (θ1, θ2, θ3, θ4 or θ5) command of the millimeter wave active array antenna system, and the beam scanning controller (for example, can be composed of 4 Arduino MCUs) converts the beam orientation command to the SPI digital control pulse wave, and the SPI digital control pulse wave is distributed to each front end circuit (FEM) in the millimeter wave 2×16 active array antenna system so as to quickly achieve the antenna beam direction. In addition, the NB controls the VNA through the GPIB interface and converts the S-parameter calculation obtained by the test into the received signal power, which is marked as P1, P2, P3, P4, and P5, and then the received maximum power is pre-determined AOD azimuth angle ($\varphi$). After the approximate range, timing switching algorithm is applied, and the AOD azimuth angle ($\varphi$) is estimated.

Figure 16:
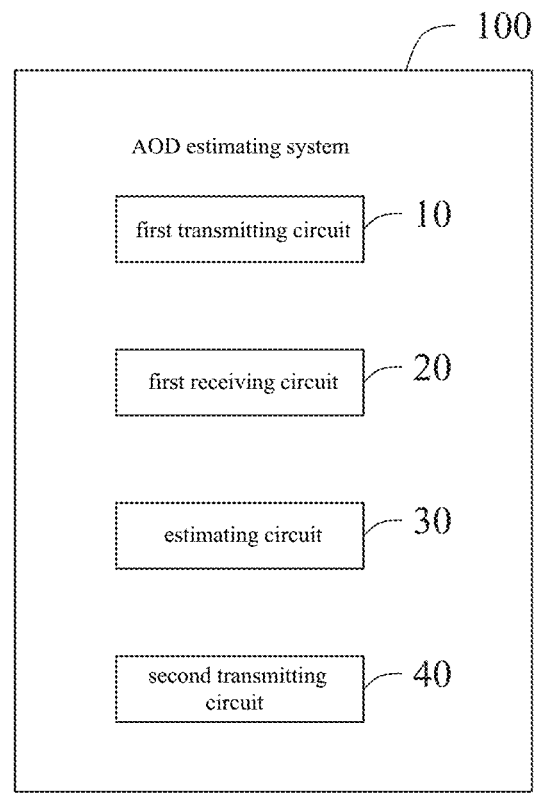
FIG. 16 is a schematic diagram of a circuit of the AOD estimating system according to an embodiment of the present disclosure.

Reference is made to FIG. 16. In an embodiment of the present disclosure, the AOD estimating system 100 includes a first transmitting circuit 10, a first receiving circuit 20, and an estimating circuit 30.

Specifically, the first transmitting circuit 10 is configured to transmit the signal by AOD; the first receiving circuit 20 is configured to switch between several azimuth angles in order to receive the signal; the estimating circuit 30 is configured to: calculate the receiving circuit for the several azimuth angles angle receives several signal powers of the signal; determine the maximum signal power of the several signal powers, determine the pre-determined AOD according to the azimuth angle corresponding to the maximum signal power, and determine the pre-determined AOD according to the pre-determined AOD and the two azimuth angles adjacent to the pre-determined AOD among the several azimuth angles are calculated to obtain the final AOD.

In this way, the AOD estimating system 100 determines the receiving angle closest to the AOD of the transmitted signal through the maximum signal power of the received several signals, and the AOD estimating system determines the receiving angle according to the two azimuth angles adjacent to the receiving angle. According to the deviation value from AOD, the final AOD can be determined.

In an embodiment, the estimating circuit 30 is further configured to: obtain the signal levels corresponding to the two azimuth angles closest to the pre-determined AOD; determine the sum signal and the difference signal of the two signal levels according to the following formula:

$$\Sigma(\psi)=S_A+S_B \approx \cos(\pi d \cdot \sin(\varphi));$$

$$\Delta(\psi)=S_A-S_B \approx \sin(\pi d \cdot \sin(\varphi)).$$

Among them, $S_A$ and $S_B$ are the signal levels corresponding to the two azimuth angles closest to the pre-determined AOD, and d is the element spacing between two adjacent antenna elements in the receiving circuit, e is the deviation angle between the final AOD and the azimuth angle corresponding to the maximum signal power. The deviation angle between AOD and the azimuth angle corresponding to the maximum signal power is obtained according to the following formula:

$$\varphi=k_f \tan^{-1}(\Delta(\varphi)/\Sigma(\varphi));$$

Among them, $k_f$ is the slope parameter obtained by calibration; the final AOD is calculated according to the deviation angle and the azimuth angle corresponding to the maximum signal power.

In this way, the first transmitting circuit 10 transmits the signal by AOD; the first receiving circuit 20 switches the azimuth angle of several beam directions in order, so that the signal received in order is the signal power from several different directions; the estimating circuit 30 obtains the signal levels correspond to the two closest azimuth angles from the pre-determined AOD, and the deviation angle is obtained according to the signal level and the above formula, and the final AOD is determined according to the deviation angle and the pre-determined AOD.

In an embodiment of the present application, the estimating circuit 30 is further configured to obtain the slope parameter obtained by calibration through the following formula:

$$k_f = \theta_{BW}/\sqrt{2};$$

$\theta_{BW}$ is the angle difference between two adjacent azimuth angles of the receiving circuit.

Specifically, the estimating circuit determines the slope parameter according to the angle difference of the azimuth angle between the two antennas in the receiving circuit, and the deviation angle is adjusted according to the slope parameter, and the final AOD is determined according to the deviation angle.

In an embodiment, the estimating circuit 30 is further configured to: obtain the offset calibration value of the receiving circuit; and adjust the final AOD according to the offset calibration value.

Specifically, each system has a corresponding error offset. The error offset of the AOD estimating system can be obtained through methods such as pre-determined detection, and the final AOD is adjusted according to the offset to improve the accuracy of AOD degrees.

Exemplarily, the offset calibration value is 0.1°, and if the AOD angle obtained by calculation is 29.9°, the actual AOD angle is 30°.

In an embodiment of the present application, the AOD estimating system 100 further includes a second transmitting circuit 40, and the second transmitting circuit 40 is configured to transmit a signal by AOD.

In this way, through the cooperation of the first transmitting circuit 10 and the second transmitting circuit 40, the first AOD of the signal sent by the first transmitting circuit 10 is received by the first receiving circuit 20 and the second AOD of the signal sent by the second transmitting circuit 40 is received by the first receiving circuit 20, in which the first AOD and the second AOD are obtained respectively and the position of the first transmitting circuit 10, the position of the second transmitting circuit 40, and the first AOD and the second AOD can confirm the position of the first receiving circuit 20.

Figure 17:
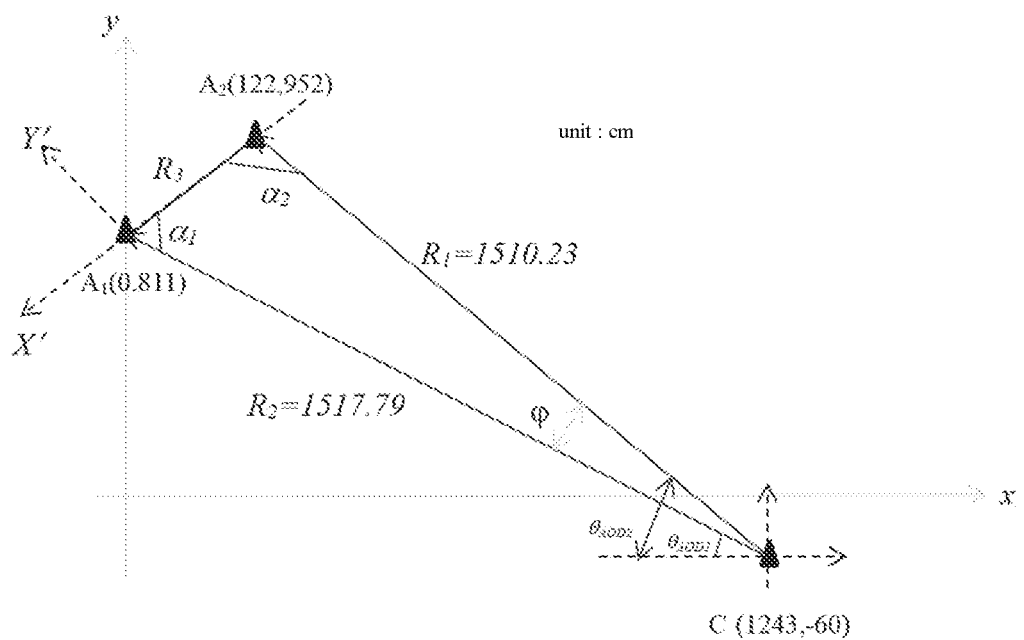
FIG. 17 is a schematic diagram of a positioning system according to an embodiment of the present disclosure.

Reference is made to FIG. 17. FIG. 17 is a schematic diagram showing a schematic diagram of a positioning system. The positioning system includes two base stations and the user equipment. The coordinates of the two base stations in the first coordinate system XY are $A_1$(0, 811) and $A_2$ (122, 952) respectively. Setting the position of the user equipment to C, the AOD angle between $A_1C$ and $A_2C$ can be obtained through the timing lobe algorithm.

Specifically, using the user equipment as the transmitting circuit and the two base stations as the receiving circuit, AOD1 and AOD2 are obtained through the timing lobe algorithm described in the above embodiment. The difference between AOD1 and AOD2 is obtain, For example: the difference between AOD2 and AOD2 is $\varphi=7.06°$.

Then, the coordinates of the positioning system in the first coordinate system XY to the coordinates of the second coordinate system X'Y' is converted. For example, when the coordinates of the two base stations in the second coordinate system are (0,0) and (186.5,0), the user equipment coordinates is set to (x', y'), and the user equipment coordinates can be obtained by the following formula:

$$x'=x_1-R_2 \cdot \cos(\varphi);$$

$$y'=y_1+R_2 \cdot \sin(\varphi);$$

$R_2$ is the distance between base station $A_1$ and the user equipment, which is the difference between AOD1 and AOD2, and the coordinates of base station $A_1$ is $x_1, y_1$).

Figure 18:
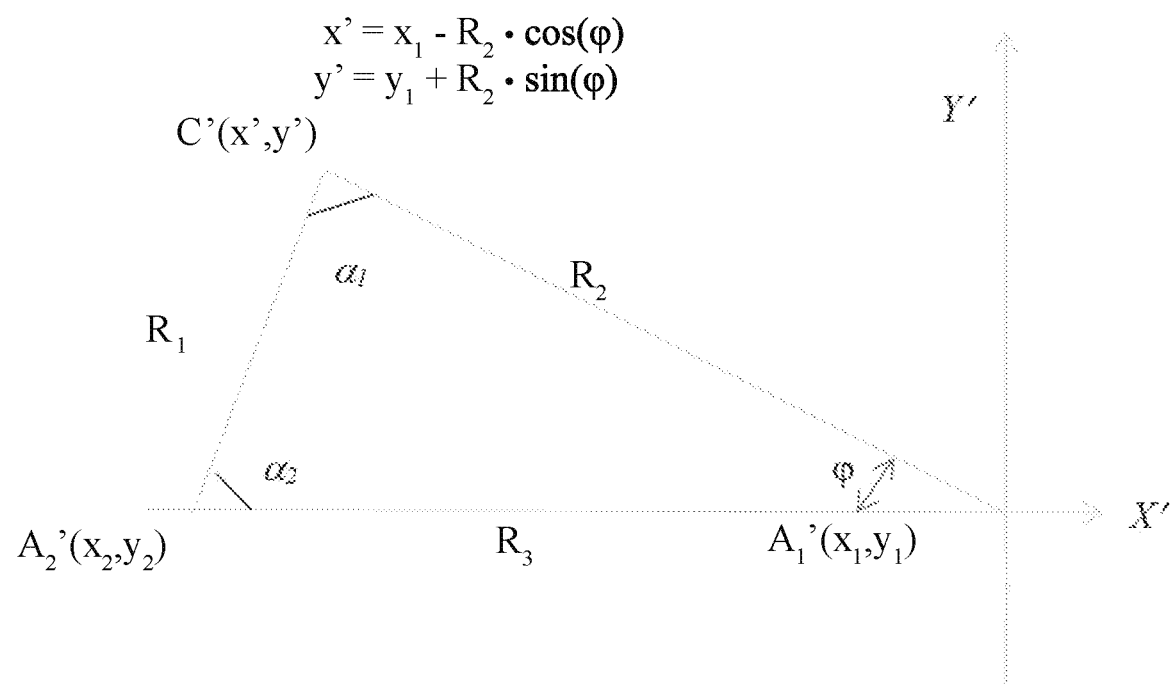
FIG. 18 is another schematic diagram of the positioning system according to an embodiment of the present disclosure.

Reference is made to FIG. 18. $x_1=0$; $y_1=0$; $R_2=1517.76$, then the coordinates of the user equipment can be obtained by the above formula: x'=−154.6, y'=1510 cm.

Then, the association relationship between the two coordinate systems is determined according to the coordinates of the base station. And the coordinates of the user equipment in the first coordinate system XY is obtained according to the association relationship. For example: x=1165.6 cm, y=−139.6 cm.

It is understandable that FIG. 17 and FIG. 18 are a positioning system provided by the present disclosure to obtain a method for obtaining the position of the user equipment. It is understandable that the above embodiment is one of the positioning methods provided by the embodiments of the present disclosure, the way to obtain the receiving circuit or the transmitting circuit is not only the way provided in the above embodiments, and the receiving circuits or the transmitting circuits are not limited to the foregoing embodiments.

Figure 19:
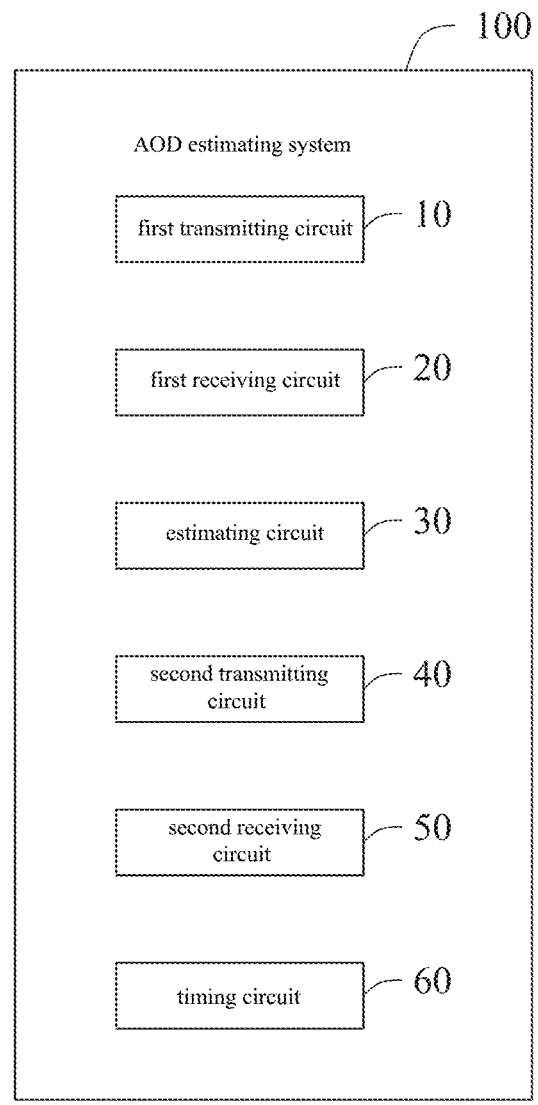
FIG. 19 is a schematic diagram of the circuit of the AOD estimating system according to another embodiment of the present disclosure.

In an embodiment, the AOD estimating system 100 includes a first transmitting circuit 10, a first receiving circuit 20, an estimating circuit 30, and a second transmitting circuit 40. The positions of the first transmitting circuit 10 and the second transmitting circuit 40 are fixed and known. The position of each transmitting circuit determines the position of the first receiving circuit 20. Similarly, in another embodiment, as shown in FIG. 19, the AOD estimating system 100 may include first transmitting circuit 10, first receiving circuit 20, estimating circuit 30 and second receiving circuit 50, first receiving circuit 20 and second receiving circuit. The position of 50 is fixed and known, and the position of the first transmitting circuit 10 can be determined by the positions of the two receiving circuits. Similarly, in another embodiment, the position of another circuit (transmitting or receiving) can be determined by the positions of two known circuits (transmitting/transmitting, transmitting/receiving, or receiving/receiving).

In an embodiment, the AOD estimating system 100 further includes a timing circuit 60. The timing circuit 60 is used for the transmission time of the signal, that is, the transmission time of the signal between the transmitting circuit sending the signal and the receiving circuit receiving the signal. In addition, the transmission rate of the signal is known, and the distance between the transmitting circuit and the receiving circuit can be obtained through the transmission time and the transmission rate.

Specifically, in an embodiment, the signal sent by the transmitting circuit carries first time information. The first time information includes the time at which the transmitting circuit sends the signal, and after the receiving circuit receives the signal, the timing circuit generates second time information, and the second time information includes the time when the receiving circuit receives the signal. The transmission time of the signal is confirmed according to the first time information and the second time information, and the distance between the transmitting circuit and the receiving circuit is determined according to the transmission time and pre-determined speed information.

In this way, the receiving circuit and the transmitting circuit can form a set of AOD system to obtain the corresponding AOD, and the position of the transmitting circuit can be determined according to the corresponding AOD and the positions of at least two receiving circuits.

The receiving circuit and the estimating circuit belong to different circuits and have different functions. In the embodiment shown in FIG. 16, the first receiving circuit 20 and the estimating circuit 30 are integrally arranged, and perform the functions of signal receiving and AOD measurement. Similarly, in the embodiment shown in FIG. 19, the first receiving circuit 20 and the estimating circuit 30 are integrated, and the second receiving circuit 50 and the estimating circuit 30 are also integrated to perform the functions of signal receiving and AOD measurement.

Figure 20:
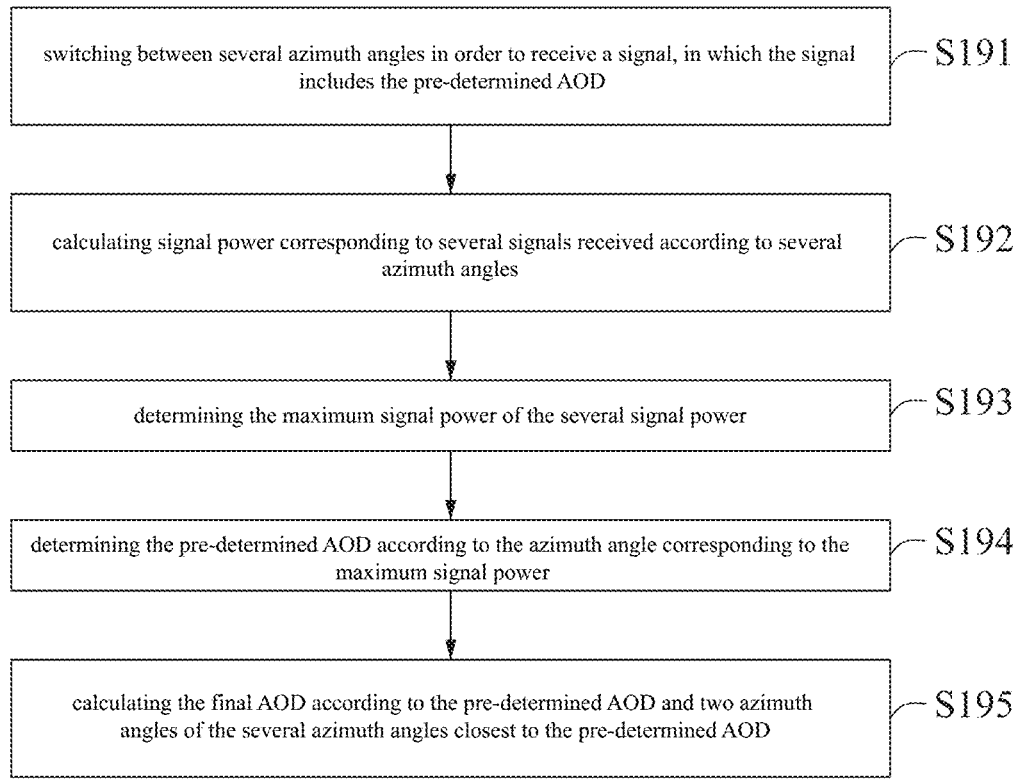
FIG. 20 is a flow chart of an AOD estimating method according to an embodiment of the present disclosure.

Reference is made to FIG. 20. FIG. 20 is the flowchart of an AOD estimating method provided by the embodiment shown in FIG. 19, according to different requirements, the sequence of operations in the flowchart can be changed, and some operations can be omitted or combined. The method includes the following operation.

In operation S191, the first receiving circuit 20 switches between the azimuth angles that each of several beams point to in order to receive the signal transmitted by the first transmitting circuit 10, and the signal includes a pre-determined AOD.

Specifically, the transmitting circuit sends a signal in pre-determined AOD, and the receiving circuit switches between several azimuth angles in order to receive the signal.

In operation S192, the estimating circuit 30 calculates the several signal power corresponding to the signal received from the several azimuth angles according to the azimuth angles pointed by the several beams.

In operation S193, the estimating circuit 30 determines the maximum signal power among the several signal power.

In operation S194, the estimating circuit 30 determines the pre-determined AOD according to the azimuth angle corresponding to the maximum signal power.

In operation S195, the estimating circuit 30 calculates the final AOD according to the pre-determined AOD and the two azimuth angles adjacent to the pre-determined AOD among the several azimuth angles, such as the two adjacent azimuth angles that are closest to the pre-determined AOD.

In this way, the azimuth angle corresponding to the maximum signal power is determined by the received several signal power, and the pre-determined AOD is determined according to the azimuth angle, and the final AOD is determined according to the pre-determined AOD and the azimuth angle adjacent to the azimuth angle.

Figure 21:
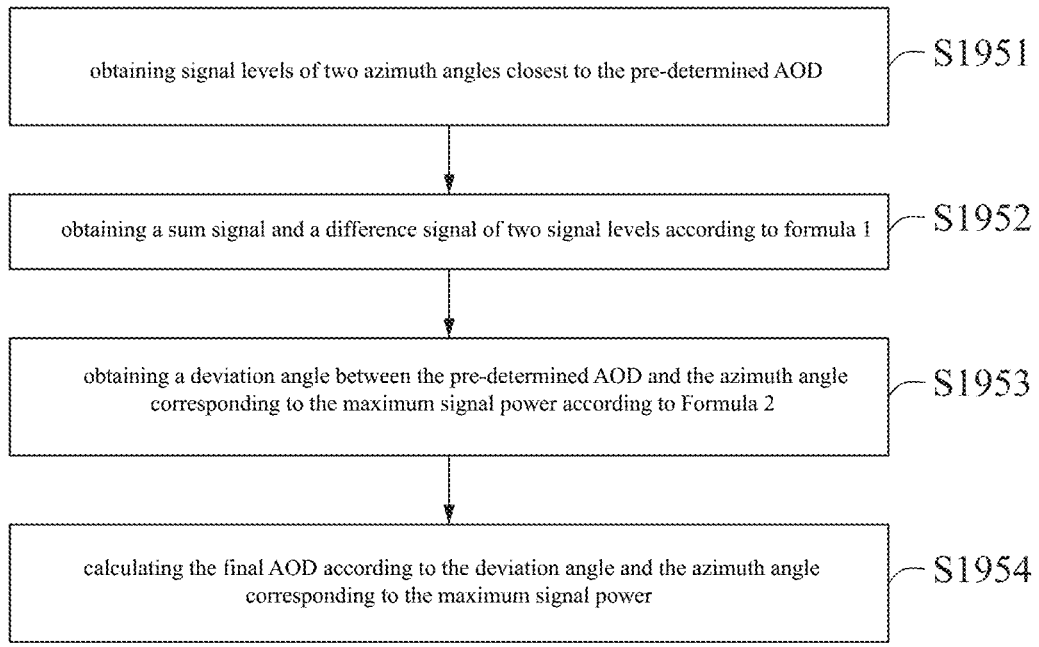
FIG. 21 is a flow chart for obtaining the final AOD according to an embodiment of the present disclosure.

In an embodiment, reference is made to FIG. 21. Operation S195 specifically includes the following operations.

In operation S1951, the signal levels of two azimuth angles adjacent to the pre-determined AOD are obtained. For example, the two adjacent azimuth angles that are closest to the pre-determined AOD are obtained.

For example, the pre-determined AOD is 30 degrees, and the two adjacent azimuth angles closest to the pre-determined AOD can be located on both sides of the pre-determined AOD, which can be 33 degrees and 27 degrees respectively.

In operation S1952, the sum signal and the difference signal of the two signal levels are obtained according to Formula 1.

The Formula 1 is:

$$\Sigma(\psi) = S_A + S_B \approx \cos(\pi d \cdot \sin(\varphi));$$

$$\Delta(\psi) = S_A - S_B \approx \sin(\pi d \cdot \sin(\varphi));$$

$S_A$ and $S_B$ are the signal levels of adjacent azimuth angles on both sides of the pre-determined AOD, d is the element spacing between two adjacent antenna elements, and $\varphi$ is the deviation angle between the pre-judged AOD and the azimuth corresponding to the maximum signal power.

In operation S1953, the deviation angle between the pre-determined AOD and the azimuth angle corresponding to the maximum signal power is obtained according to Formula 2.

Formula 2 is:

$$\varphi = k_f \tan^{-1}(\Delta(\varphi)/\Sigma(\varphi));$$

Among them, $k_f$ is the slope parameter obtained by calibration.

In operation S1954, the final AOD is calculated according to the deviation angle and the azimuth angle corresponding to the maximum signal power.

In an embodiment, the AOD estimating method also includes the following operation: obtaining the offset calibration value of the receiving circuit; adjusting the AOD according to the offset calibration value:

$$k_f = \theta_{BW}/\sqrt{2};$$

Among them, $\theta_{BW}$ is the distance angle between two adjacent azimuth angles of the receiving circuit.

In an embodiment, the AOD estimating method further includes the following operation: obtaining an offset calibration value of the receiving circuit; and adjusting the AOD according to the offset calibration value.

Furthermore, the embodiment of the present disclosure also provides a positioning method, which includes: applying the AOD estimating method described in the above embodiment to obtain the final AOD; according to the final AOD, the position of the device to be positioned can be determined, wherein the device to be positioned can be the sender of signal or the receiver of signal.

In an embodiment, the positioning method further includes: obtaining the sending time of the signal; obtaining the receiving time of the signal; determining the propagation distance of the signal according to the sending time, receiving time, and pre-determined speed information; and determining the location of the terminal to be located based on the propagation distance and the final AOD.

Illustratively, the propagation speeds of different signals in the air are known, such as the propagation speeds of the sound waves or the electromagnetic waves in the air.

Figure 22:
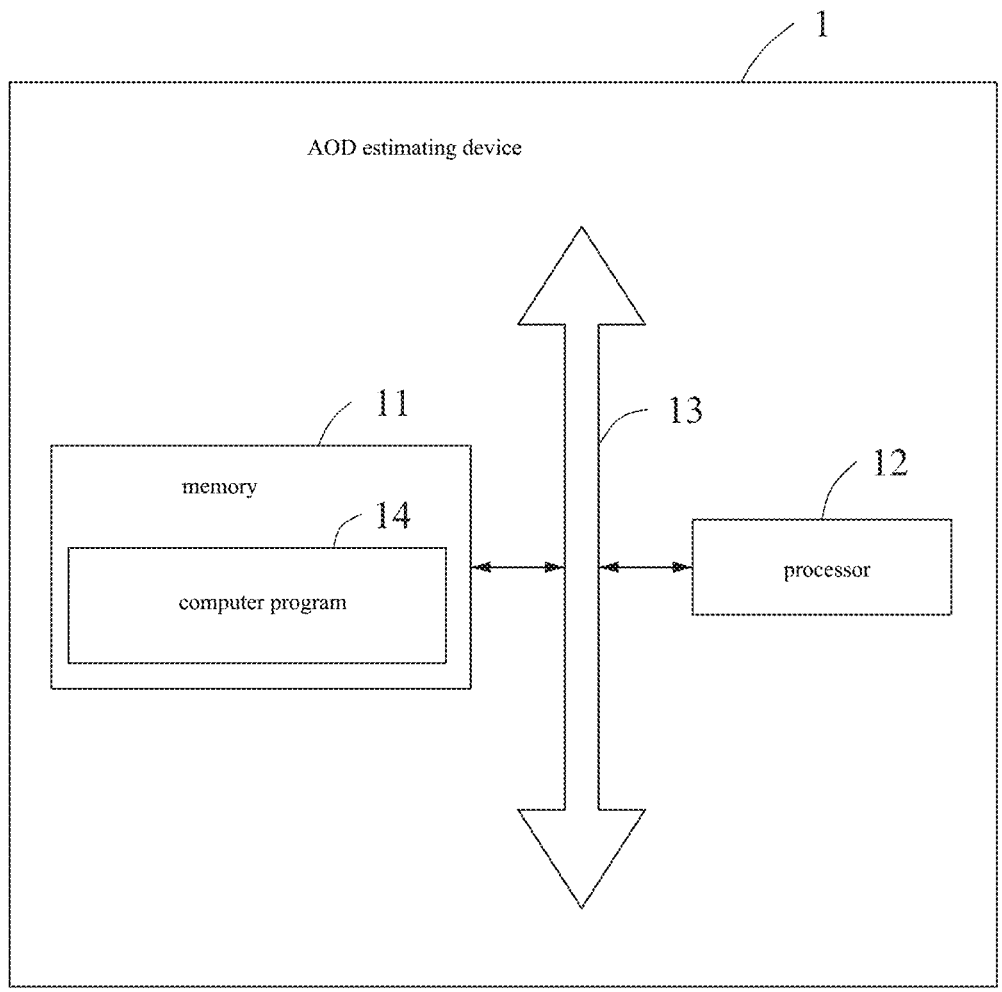
FIG. 22 is a schematic diagram illustrating an AOD estimating device according to an embodiment of the present disclosure.

FIG. 22 is a schematic diagram of the architecture of the AOD estimating device provided by an embodiment of the present disclosure. The AOD estimating device 1 includes a memory 11, a processor 12, and a communication bus 13, and the memory 11 is communicatively connected with the processor 12 through the communication bus 13.

The AOD estimating device 1 also includes a computer program 14 stored in the memory 11 and is run on the processor 12, such as an AOD measure program.

When the processor 12 executes the computer program 14, the operation of automatically searching for the parking space in the method embodiment is realized. Alternatively, the processor 12 executes the computer program 14 to implement the functions of each circuit/unit in the system embodiment.

Exemplarily, the computer program 14 may be divided into one or more circuits/units, and the one or more circuits/units are stored in the memory 11 and executed by the processor 12 to complete the embodiments of the present disclosure. The one or more circuits/units may be a series of computer program instruction segments capable of completing specific functions, and the instruction segments are configured to describe the execution process of the computer program 14 in the AOD estimating device 1.

Understandably, the FIG. 22 is only an example of the AOD estimating device 1, and does not constitute a limitation on the AOD estimating device 1. The AOD estimating device 1 may include more or less components than shown, or combining some components, or different components. For example, the AOD estimating device 1 may also include an input device and the like.

The so-called processor 12 may be a central processing unit (CPU), and may also include other general-purpose processors, a digital signal processor (DSP), and a dedicated integrated circuit (Application Specific Integrated Circuit, ASIC), programmable gate array (Field-Programmable Gate Array, FPGA) or other programmable logic devices, discrete gate or transistor logic devices, discrete hardware components, etc. The general-purpose processor can be a microprocessor or the processor can also be any conventional processor, etc. The processor 12 is the control center of the AOD estimating device 10, and the processor 12 connects the parts of the entire AOD estimating device 10 through various interfaces and lines.

The memory 11 can be configured to store the computer program 14 and/or circuit/unit, and the processor 12 runs or executes the computer program and/or circuit/unit stored in the memory 11 and calls The data stored in memory 11 realizes various functions of the AOD estimating device 1. The memory 11 can include external storage medium or memory. In addition, the memory 11 may include high-speed random access memory, and may also include non-volatile memory, such as hard disks, memory, plug-in hard disks, smart media card (SMC), and secure digital (SD) card, flash memory card (Flash Card), at least one disk memory device, flash memory device, or other volatile solid memory devices.

If the integrated circuit/unit of the AOD estimating device 1 is implemented in the form of a software functional unit and sold or used as an independent product, it can be stored in a computer readable storage medium. Based on this understanding, this application implements all or part of the processes in the embodiment method, and can also be completed by instructing related hardware through a computer program. The computer program can be stored in a computer-readable storage medium. When the computer program is executed by the processor, the operation of the various method embodiments can be realized. It should be noted that the content contained in the computer-readable medium can be appropriately added or deleted according to the requirements of the legislation and patent practice in the jurisdiction. For example, in some jurisdictions, according to the legislation and patent practice, the computer-readable medium does not include electric carrier signal and telecommunications signal.

The above embodiments are only configured to illustrate the technical solutions of the present invention and not to limit them. Although the present invention has been described in detail with reference to the above preferred embodiments, those of ordinary skill in the art should understand that the technical solutions of the present invention can be modified or equivalent replacements should not depart from the spirit and scope of the technical solution of the present invention.

What is claimed is:

1. A communication device for estimating azimuth angle, comprising:
    a receiving circuit, configured to switch between a plurality of azimuth angles in order to receive a first signal transmitted with a first angle of departure (AOD) transmitted from a first transmitting circuit of a first communication device; and
    an estimating circuit, configured to:
    calculate a plurality of signal power of the first signal with the receiving circuit located at the plurality of azimuth angles;
    determine a maximum signal power of the plurality of signal power;
    determine a pre-determined AOD according to a first azimuth angle corresponding to the maximum signal power; and
    calculate to obtain a final AOD corresponding to the first signal according to the pre-determined AOD and a deviation angle that is obtained according to the first signal of at least one azimuth angle of the plurality of azimuth angles adjacent to the pre-determined AOD.

2. The communication device of claim 1, wherein the at least one azimuth angle adjacent to the pre-determined AOD comprises two azimuth angles left adjacent to and right adjacent to and closest to the pre-determined AOD.

3. The communication device of claim 2, wherein the estimating circuit is further configured to:
    obtain two signal levels corresponding to the two azimuth angles adjacent to the pre-determined AOD;

determine a sum signal and a difference signal of the two signal levels according to the following formula:

$$\Sigma(\psi)=S_A+S_B\approx\cos(\pi d\cdot\sin(\varphi));$$

$$\Delta(\psi)=S_A-S_B\approx\sin(\pi d\cdot\sin(\varphi)).$$

wherein $S_A$ and $S_B$ respectively represent the two signal levels corresponding to the two azimuth angles adjacent to the pre-determined AOD, d represents a spacing between two adjacent antenna elements of the receiving circuit, and φ represents the deviation angle between the final AOD and the first azimuth angle corresponding to the maximum signal power;

obtain the deviation angle between the final AOD and the first azimuth angle corresponding to the maximum signal power according to the following formula:

$$\varphi=k_f\tan^{-1}(\Delta(\varphi)/\Sigma(\varphi))$$

wherein $k_f$ is a slope parameter obtained through calibration; and calculate the final AOD according to the deviation angle and the first azimuth angle corresponding to the maximum signal power.

4. The communication device of claim 3, wherein the estimating circuit is further configured to:

obtain a slope parameter of calibration through the following formula:

$$k_f=\theta_{BW}/\sqrt{2};$$

wherein $\theta_{BW}$ is an angle difference of the two azimuth angles in adjacent to the receiving circuit.

5. The communication device of claim 3, wherein the estimating circuit is further configured to:

obtain an offset calibration value of the receiving circuit; and adjust the final AOD according to the offset calibration value.

6. The communication device of claim 1, wherein the communication device is further configured to:

switch between the plurality of azimuth angles in order to obtain a second signal transmitted from a second transmitting circuit of a second communication device with a second AOD;

calculate to obtain a final AOD corresponding to the second signal; and calculate a position of the communication device according to a known position of the first communication device and the final AOD of the first signal and a known position of the second communication device and the final AOD of the second signal.

7. The communication device of claim 6, further comprising:

a timing circuit, configured to obtain a transmission time of the first signal and the second signal; and a positioning circuit, configured to determine a transmission distance of the first signal and the second signal according to the transmission time, and to determine the position of the communication device according to the transmission distance and the final AOD.

8. The communication device of claim 1, further configured to:

receive a final AOD corresponding to the first signal calculated and transmitted by a third communication device; and calculate a position of the first communication device according to a known position of the communication device, and the final AOD of the first signal calculated by the communication device, and a known position of the third communication device and the final AOD of the first signal calculated by the third communication device.

9. The communication device of claim 1, wherein the communication device comprises a mobile phone or a base station.

10. The communication device of claim 1, wherein the communication device is further configured to:

calculate a final AOA (angle of arrival) by the estimating circuit according to the obtained calculating method for the final AOD.

11. An estimating method for a communication device, comprising:

switching between a plurality of azimuth angles in order to receive a signal, wherein the signal comprises a pre-determined AOD;

calculating a plurality of signal power corresponding to the signal received according to the plurality of azimuth angles;

determining a maximum signal power of the plurality of signal power;

determining the pre-determined AOD according to a first azimuth angle corresponding to the maximum signal power; and calculating to obtain a final AOD according to the pre-determined AOD and a deviation angle that is obtained according to the signal of at least one azimuth angle of the plurality of azimuth angles adjacent to the pre-determined AOD.

12. The estimating method of claim 11, wherein the at least one azimuth angle adjacent to the pre-determined AOD includes two azimuth angles left adjacent to and right adjacent to and closest to the pre-determined AOD.

13. The estimating method of claim 12, wherein calculating to obtain the final AOD according to the pre-determined AOD and the two azimuth angles of the plurality of azimuth angles adjacent to the pre-determined AOD further comprises:

obtaining two signal levels of the two azimuth angles adjacent to the pre-determined AOD;

obtaining a sum signal and a difference signal of the two signal levels according to the following formula:

$$\Sigma(\psi)=S_A+S_B\approx\cos(\pi d\cdot\sin(\varphi));$$

$$\Delta(\psi)=S_A-S_B\approx\sin(\pi d\cdot\sin(\varphi));$$

wherein $S_A$ and $S_B$ respectively represents the two signal levels corresponding to the two azimuth angles adjacent to the pre-determined AOD, d represents a spacing between two adjacent antenna elements of a receiving circuit, and φ represents the deviation angle between the final AOD and the first azimuth angle corresponding to the maximum signal power;

obtain the deviation angle between the final AOD and the first azimuth angle corresponding to the maximum signal power according to the following formula:)

$$\varphi=k_f\tan^{-1}(\Delta(\varphi)/\Sigma(\varphi));$$

wherein $k_f$ is a slope parameter obtained through calibration; and calculating the final AOD according to the deviation angle and the first azimuth angle corresponding to the maximum signal power.

14. The estimating method of claim 13, further comprising:

obtaining a slope parameter of calibration through the following formula:

$$k_f = \theta_{BW}/\sqrt{2};$$

wherein $\theta_{BW}$ is an angle difference of the two azimuth angles in adjacent to the receiving circuit.

15. The estimating method of claim 13, further comprising:
   obtaining an offset calibration value of the receiving circuit; and
   adjusting the final AOD according to the offset calibration value.

16. The estimating method of claim 11, wherein the communication device comprises a mobile phone or a base station, and the estimating method for obtaining the final AOD can also be calculated to obtain a final AOA.

17. A communication device for estimating a position by calculating AOD, comprising:
   a receiving circuit, configured to switch between a plurality of azimuth angles in order to receive a first signal transmitted by a first transmitting circuit of a first communication device with a first AOD and a second signal transmitted by a second transmitting circuit of a second communication device with a second AOD; and
   an estimating circuit, configured to:
   calculate a plurality of signal power of the first signal and the second signal received by the receiving circuit located at the plurality of azimuth angles;
   determine a maximum signal power of the plurality of signal power of the first signal and a maximum signal power of the plurality of signal power of the second signal;
   determine a pre-determined AOD of the first signal according to a azimuth angle corresponding to the maximum signal power of the plurality of signal power of the first signal, and a pre-determined AOD of the second signal according to a azimuth angle corresponding to the maximum signal power of the plurality of signal power of the second signal;
   calculate to obtain a final AOD of the first signal according to the pre-determined AOD of the first signal and a deviation angle that is obtained according to the first signal of at least one azimuth angle of the plurality of azimuth angles adjacent to the pre-determined AOD, and a final AOD of the second signal according to the pre-determined AOD of the second signal and a deviation angle that is obtained according to the second signal of at least one azimuth angle of the plurality of azimuth angles adjacent to the pre-determined AOD; and
   calculate a position of the communication device according to a known position of the first communication device and the final AOD of the first signal, and a known position of the second communication device and the final AOD of the second signal.

18. The communication device of claim 17, wherein the at least one azimuth angle adjacent to the pre-determined AOD includes two azimuth angles left adjacent to and right adjacent to and closest to the pre-determined AOD; wherein the communication device comprises a mobile phone or a base station, and a calculation method for obtaining the final AOD can also be calculated to obtain a final AOA.

19. The communication device of claim 18, wherein the estimating circuit is further configured to:
   obtain two signal levels corresponding to the two azimuth angles adjacent to the pre-determined AOD;
   determine a sum signal and a difference signal of the two signal levels according to the following formula:

$$\Sigma(\psi) = S_A + S_B \approx \cos(\pi d \cdot \sin(\varphi));$$

$$\Delta(\psi) = S_A - S_B \approx \sin(\pi d \cdot \sin(\varphi)).$$

wherein $S_A$ and $S_B$ respectively represents the two signal levels corresponding to the two azimuth angles adjacent to the pre-determined AOD, d represents a spacing between two adjacent antenna elements of the receiving circuit, and $\varphi$ represents the deviation angle between the final AOD and the azimuth angle corresponding to the maximum signal power;
   obtain the deviation angle between the final AOD and the azimuth angle corresponding to the maximum signal power according to the following formula:

$$\varphi = k_f \tan^{-1}(\Delta(\varphi)/\Sigma(\varphi),$$

wherein $k_f$ is a slope parameter obtained through calibration;
   calculate the final AOD according to the deviation angle and the azimuth angle corresponding to the maximum signal power; and
   obtain the slope parameter of calibration through the following formula:

$$k_f = \theta_{BW}/\sqrt{2};$$

wherein $\theta_{BW}$ is an angle difference of the two azimuth angles in adjacent to the receiving circuit; and
   obtain an offset calibration value of the receiving circuit; and
   adjust the final AOD according to the offset calibration value.

20. The communication device of claim 19, further comprising:
   a timing circuit, configured to obtain a transmission time of the first signal and a transmission time of the second signal; and
   a positioning circuit, configured to determine a transmission distance of the first signal and a transmission distance of the second signal according to the transmission time of the first signal and the transmission time of the second signal, and to determine the position of the communication device according to the transmission distance of the first signal and the transmission distance of the second signal and the final AOD.

* * * * *